US012779568B2

(12) United States Patent
Takeda et al.

(10) Patent No.: US 12,779,568 B2
(45) Date of Patent: Nov. 3, 2026

(54) WIRE ELECTRIC DISCHARGE MACHINING APPARATUS

(71) Applicant: Sodick Co., Ltd., Kanagawa (JP)

(72) Inventors: Tsuyoshi Takeda, Kanagawa (JP); Hiroki Sato, Kanagawa (JP); Tsubasa Kuragaya, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 585 days.

(21) Appl. No.: 18/499,163

(22) Filed: Oct. 31, 2023

(65) Prior Publication Data

US 2024/0149362 A1 May 9, 2024

(30) Foreign Application Priority Data

Nov. 7, 2022 (JP) ................................ 2022-178227

(51) Int. Cl.
*B23H 7/10* (2006.01)
*B23H 11/00* (2006.01)

(52) U.S. Cl.
CPC ............ *B23H 7/101* (2013.01); *B23H 7/102* (2013.01)

(58) Field of Classification Search
CPC ........ B23H 7/101; B23H 7/102; B23H 7/108; B23H 1/02; B23H 7/10
USPC ..... 219/69, 69.11, 69.15, 69.1, 69.16, 69.17, 219/68
See application file for complete search history.

(56) References Cited

U.S. PATENT DOCUMENTS

| | | | | |
|---|---|---|---|---|
| 5,726,686 | A | 3/1998 | Taniishi et al. | |
| 10,010,957 | B2 * | 7/2018 | Inoue | B23H 1/10 |
| 11,185,939 | B2 * | 11/2021 | Sakaguchi | B23H 7/10 |
| 2013/0140277 | A1 | 6/2013 | Itokazu et al. | |

FOREIGN PATENT DOCUMENTS

| | | |
|---|---|---|
| JP | H01114924 | 5/1989 |
| JP | H01135426 | 5/1989 |
| JP | H042418 | 1/1992 |
| JP | H0592322 | 4/1993 |
| JP | H0819920 | 1/1996 |
| JP | 2006224215 | 8/2006 |
| JP | 2008012644 | 1/2008 |
| JP | WO2012042980 | 2/2014 |
| JP | 6605564 | 11/2019 |
| JP | 2020138268 | 9/2020 |

* cited by examiner

*Primary Examiner* — Quang T Van
(74) *Attorney, Agent, or Firm* — JCIPRNET

(57) ABSTRACT

A guide pipe provided along a movement path of a wire electrode between a direction change pulley and a winding device and guiding the wire electrode has antistatic properties. A gas-liquid mixed fluid is supplied into the guide pipe. A suction nozzle passes between a pair of rollers of the winding device and is directly or indirectly connected to an outlet side of the guide pipe. The suction nozzle suctions the gas-liquid mixed fluid in the guide pipe and a tip of the wire electrode by a suction device and captures the wire electrode. The captured wire electrode is wound by the winding device.

10 Claims, 18 Drawing Sheets

WIRE ELECTRIC DISCHARGE MACHINING APPARATUS

CROSS-REFERENCE TO RELATED APPLICATIONS

This application claims the priority benefit of Japan Application No. 2022-178227, filed on Nov. 7, 2022. The entirety of the above-mentioned patent application is hereby incorporated by reference herein and made a part of this specification.

BACKGROUND

Technical Field

The disclosure relates to a wire electric discharge machining apparatus equipped with a wire electrode conveyance device that feeds a wire electrode to a winding device during automatic wire threading. In particular, the disclosure relates to a wire electric discharge machining apparatus equipped with a conveyance device based on a fluid transfer method that includes a guide pipe.

Related Art

In general, a wire electric discharge machining apparatus is configured in which a wire electrode wound around a wire bobbin is let out, and passes through an upper wire guide and a lower wire guide so as to be wound by a winding device composed of a pair of winding rollers. Many wire electric discharge machining apparatuses are equipped with an automatic wire threader that automatically stretches the wire electrode between the upper wire guide and the lower wire guide. In the automatic wire threader, the wire electrode is fed toward the upper wire guide by a feed roller, sequentially inserted through the upper wire guide and the lower wire guide, and guided to the outside of a machining tank by a wire electrode conveyance device provided along a lower arm, and a tip of the wire electrode is captured by the winding device.

In the wire electrode conveyance device, as a method for moving the wire electrode to the winding device, there are known a method for moving the wire electrode with a belt conveyor and a method for moving the wire electrode with a fluid. Hereinafter, for convenience of description, the method for moving the wire electrode with a belt conveyor will be referred to as a belt transfer method, and the method for moving the wire electrode with a fluid will be referred to as a fluid transfer method.

Japanese Patent Laid-open No. H1-114924 (Patent Document 1) discloses a wire electric discharge machining apparatus equipped with a typical conveyance device based on the belt transfer method. Since the conveyance device based on the belt transfer method is configured in which a pair of endless belts sandwich the wire electrode and transmit force to the wire electrode by friction to cause the wire electrode to move, it is advantageous for conveying a relatively large wire electrode having a diameter of ø0.2 mm or more. However, compared to one based on the fluid transfer method, the conveyance device based on the belt transfer method is large in overall size. When feeding a wire electrode having a relatively small diameter, load applied to the wire electrode relatively increases, and disconnection, wrapping, or deviation is likely to occur in the wire electrode.

Japanese Patent Laid-open No. H1-135426 (Patent Document 2) and Japanese Patent Laid-open No. H5-92322 (Patent Document 3) representatively disclose a wire electric discharge machining apparatus equipped with a conveyance device based on the fluid transfer method. In general, in the conveyance device based on the fluid transfer method, a guide pipe is filled with high-pressure fluid, and the fluid is suctioned together with the wire electrode by an aspirator, so as to feed the wire electrode. Hence, if the wire electrode has high rigidity, tends to curl and has an excessively large diameter, a tip of the wire electrode is likely to get caught in the guide pipe and buckle. If the wire electrode has an excessively small diameter, there is a risk that the wire electrode may stick to an inner surface of the guide pipe and become unable to move. Thus, the conveyance device is not very suitable.

Japanese Patent No. 6605564 (Patent Document 4) discloses a wire electric discharge machining apparatus in which a conveyance device based on the fluid transfer method and equipped with no guide pipe is provided. In the conveyance device of the wire electric discharge machining apparatus disclosed in Patent Document 4, since the wire electrode can be moved at once only by a binding force of a fluid, a conveyance time of the wire electrode until a tip of the wire electrode is captured by a winding device can be shortened. However, in the case of performing machining by a die sinking method in which a workpiece is immersed in a machining fluid, it is necessary to provide a cover for securing a movement path of the wire electrode that is moved only by the binding force of the fluid.

In a general wire electric discharge machining apparatus, the lower arm that supports a lower wire guide unit accommodating the lower wire guide is installed so as to penetrate a machining tank wall. Hence, at least if machining is performed by the die sinking method in which the workpiece is immersed in the machining fluid, a sealing device that prevents the machining fluid in the machining tank from leaking is required between the lower arm and the machining tank wall. The sealing device has a problem that sealing resistance causes inconveniences in machining. A sealing structure of the sealing device makes complex the configuration around the machining tank.

The belt conveyor or the guide pipe of the conveyance device is provided along the lower arm outside the lower arm or within the hollow of the lower arm. If the lower arm is changed in shape so as to climb over the machining tank wall in order to get rid of the sealing structure, the movement path of the wire electrode goes from the bottom to the top and has a so-called ascending shape. Hence, it is necessary to change the arrangement of the belt conveyor or the guide pipe or to change the outer shape in accordance with a change in the movement path of the wire electrode.

Accordingly, with the machining tank and the lower arm being movable relative to each other, if the lower arm is changed in shape so as to go over the machining tank wall and is to be installed, in the conveyance device based on the belt transfer method, since an angle at which a movement direction of the wire electrode is changed is greater than that in a configuration in which the movement path of the wire electrode is substantially horizontal, disconnection is relatively likely to occur in the wire electrode. In the conveyance device based on the fluid transfer method, since the wire electrode, which tends to fall due to gravity, is lifted along an upward movement path, the wire electrode is relatively likely to buckle.

SUMMARY

A wire electric discharge machining apparatus of the disclosure includes: a lower arm, supporting a lower wire guide unit so as to be located in a machining tank; at least one direction change pulley, provided on the lower arm so as to be located below the lower wire guide unit; a winding device, including a pair of rollers provided so as to be located outside the machining tank; and, as a conveyance device: a guide pipe having antistatic properties, provided along a movement path of a wire electrode between the at least one direction change pulley and the winding device, and including therein a first communication path allowing the wire electrode and a gas-liquid mixed fluid in which a gas and a machining fluid are mixed to pass therethrough; a suction nozzle, provided on a downstream side in a feeding direction of the wire electrode of the winding device, and including therein a second communication path allowing the wire electrode and the gas-liquid mixed fluid to pass therethrough and a first discharge path discharging the gas-liquid mixed fluid; and a suction device, connected to the first discharge path and discharging the gas-liquid mixed fluid from the first discharge path.

DESCRIPTION OF THE EMBODIMENTS

Figure 1:
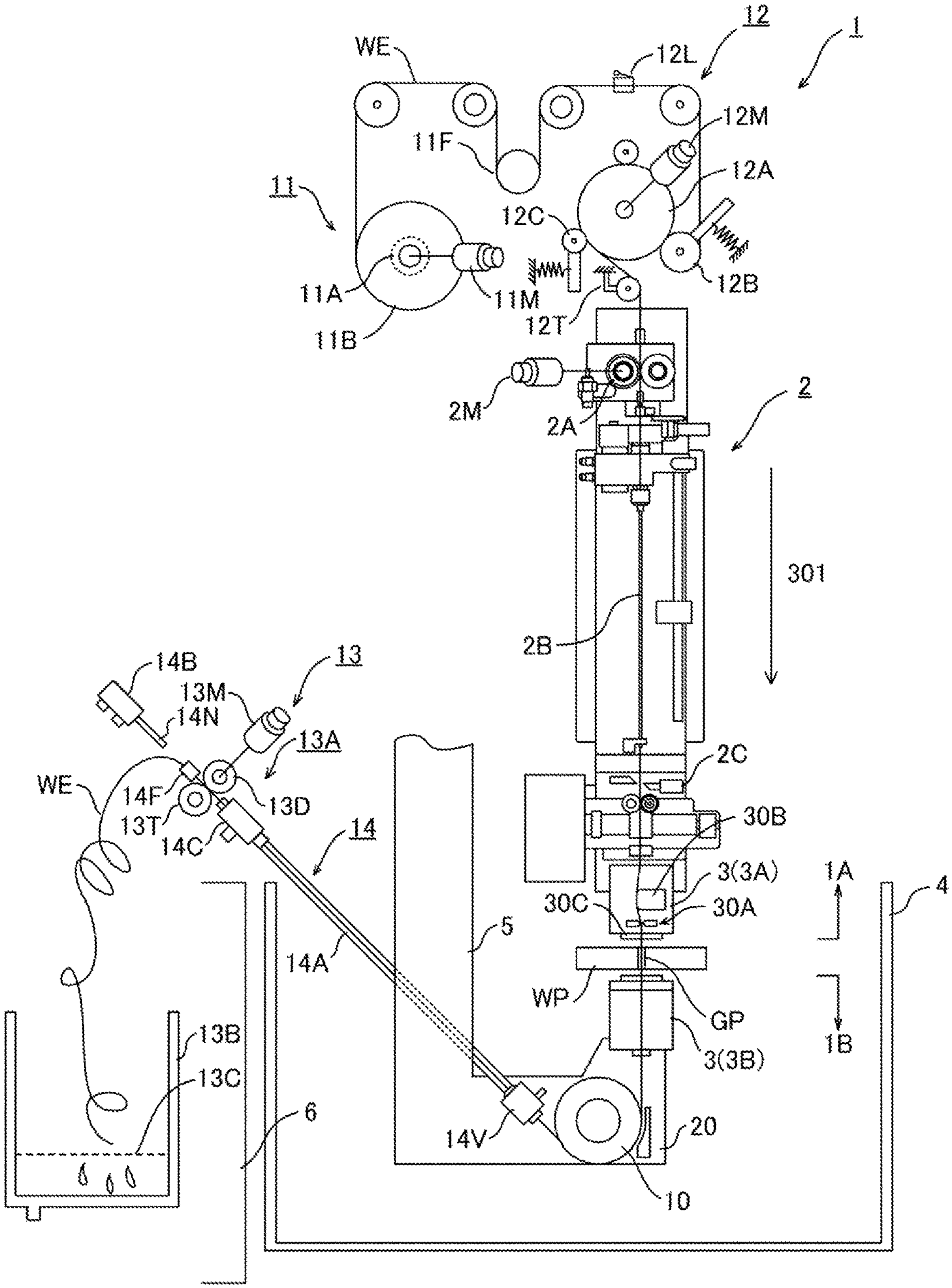
FIG. 1 schematically illustrates an overall configuration of a wire electric discharge machining apparatus according to the disclosure.

The disclosure provides a wire electric discharge machining apparatus equipped with a conveyance device based on a fluid transfer method and equipped with a guide pipe, the wire electric discharge machining apparatus having a structure in which a lower arm and a guide pipe do not penetrate a machining tank wall.

A wire electric discharge machining apparatus of the disclosure includes: a lower arm, supporting a lower wire guide unit so as to be located in a machining tank; at least one direction change pulley, provided on the lower arm so as to be located below the lower wire guide unit; a winding device, including a pair of rollers provided so as to be located outside the machining tank; and, as a conveyance device: a guide pipe having antistatic properties, provided along a movement path of a wire electrode between the at least one direction change pulley and the winding device, and including therein a first communication path allowing the wire electrode and a gas-liquid mixed fluid in which a gas and a machining fluid are mixed to pass therethrough; a suction nozzle, provided on a downstream side in a feeding direction of the wire electrode of the winding device, and including therein a second communication path allowing the wire electrode and the gas-liquid mixed fluid to pass therethrough and a first discharge path discharging the gas-liquid mixed fluid; and a suction device, connected to the first discharge path and discharging the gas-liquid mixed fluid from the first discharge path.

In particular, in the wire electric discharge machining apparatus of the disclosure, the conveyance device may include a defoaming device that defoams the gas-liquid mixed fluid.

The conveyance device of the disclosure includes the suction nozzle as a first discharge device, and further includes a second discharge device connected to an outlet of the wire electrode of the guide pipe. The second discharge device includes therein a third communication path allowing the wire electrode and the gas-liquid mixed fluid to pass therethrough and a second discharge path discharging the gas-liquid mixed fluid, and the second discharge path is connected to the suction device.

In the wire electric discharge machining apparatus equipped with a conveyance device and a control device of the disclosure, the conveyance device includes a first cylinder device connected to the suction nozzle. The control device drives the first cylinder device to reciprocally move a suction port of the suction nozzle from the downstream side in the feeding direction of the wire electrode of the winding device being an initial position to pass between the pair of rollers to a position connected to an outlet of the wire electrode of the first communication path.

In the wire electric discharge machining apparatus equipped with a conveyance device and a control device of the disclosure, the conveyance device includes a gas-liquid mixing port provided on an upstream side in the feeding direction of the wire electrode of the guide pipe and introducing the gas into the wire electric discharge machining apparatus. The control device drives the suction device to mix the gas flowing in from the gas-liquid mixing port with the machining fluid to generate the gas-liquid mixed fluid, suction the gas-liquid mixed fluid and a tip of the wire electrode fed together with the gas-liquid mixed fluid through the first communication path and the second communication path from an inlet of the wire electrode of the first communication path, and discharge the gas-liquid mixed fluid from the first discharge path.

Furthermore, in the wire electric discharge machining apparatus equipped with a conveyance device and a control device of the disclosure, the pair of rollers are provided centering on the movement path of the wire electrode at an outlet of the wire electrode of the first communication path. The wire electric discharge machining apparatus includes a second cylinder device connected to the pair of rollers. The control device drives the second cylinder device to mutually open and close the pair of rollers centering on the movement path of the wire electrode, and sandwich the wire electrode discharged from the outlet of the wire electrode of the first communication path.

In the wire electric discharge machining apparatus equipped with a conveyance device and a control device of the disclosure, the control device switches between connection between the first discharge device and the suction device and connection between the second discharge device and the suction device based on a diameter value of the wire electrode.

According to the disclosure, since the wire electrode can be carried on the gas-liquid mixed fluid in which the machining fluid and air are mixed and be fed in the guide pipe that has antistatic properties and has a smooth inner surface, during a period during which a fine wire electrode having a diameter of ø0.2 mm or less (especially an ultrafine wire electrode having a diameter of ø0.1 mm or less) passes through the guide pipe until being captured by a winding roller, a risk that the wire electrode may stick to the inner surface of the guide pipe or that the tip of the wire electrode may be caught and become unable to move is reduced.

Hence, during automatic wire threading, even if the movement path of the wire electrode in the conveyance device goes from the bottom to the top, that is, in the so-called upward direction, the wire electrode can be moved so that the winding device is relatively reliably able to capture and wind the wire electrode. As a result, the guide pipe of the conveyance device can be installed so as to go over without penetrating the machining tank wall, and the sealing device provided on the machining tank wall can be removed.

Figure 7:
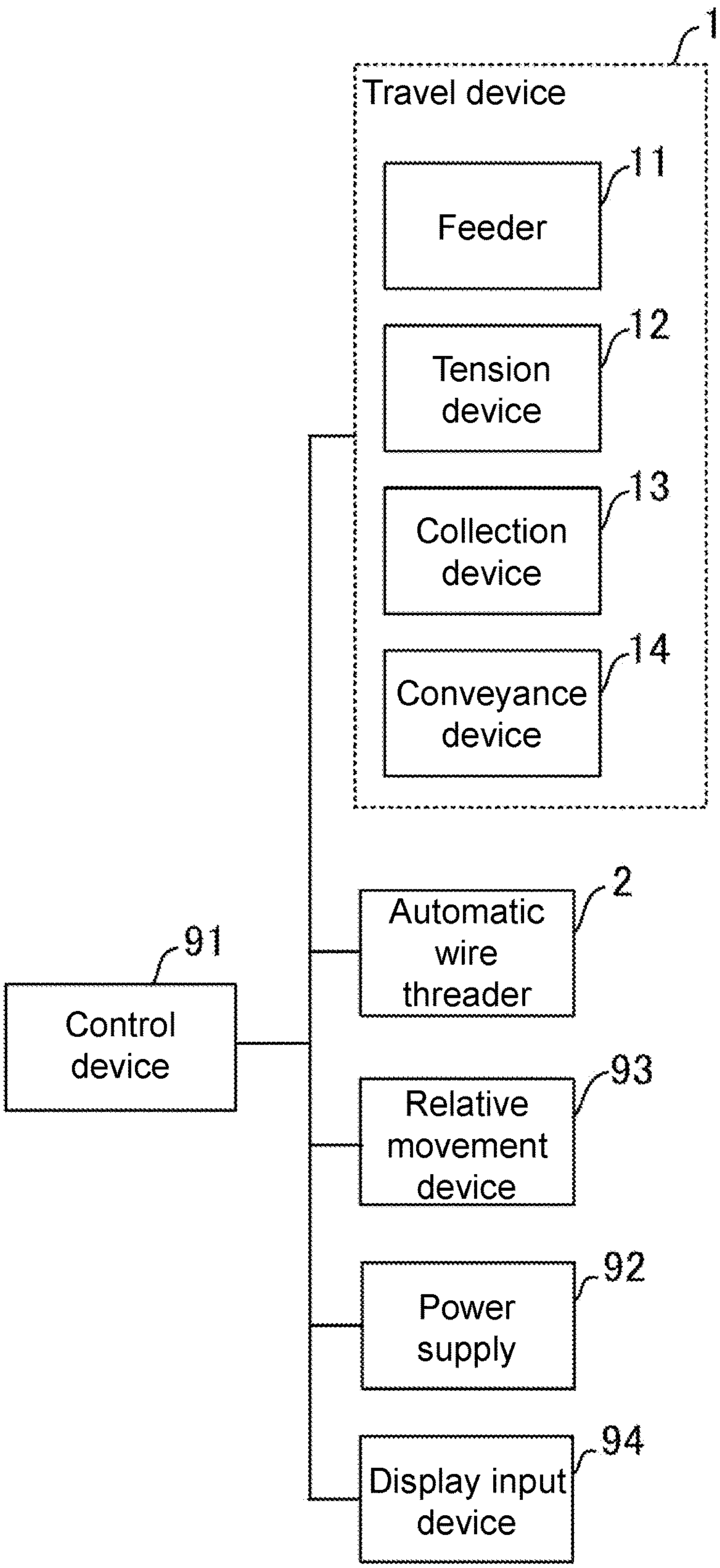
FIG. 7 is a block diagram of the wire electric discharge machining apparatus according to the disclosure.

FIG. 1 illustrates an overall outline of a wire electric discharge machining apparatus according to the disclosure. FIG. 7 illustrates a block diagram of the wire electric discharge machining apparatus. In order to show the entire travel path (movement path) of a wire electrode in one view, FIG. 1 illustrates a feed side of the wire electrode as viewed from the front of the main machine and illustrates a collection side of the wire electrode as viewed from the left side of the main machine. FIG. 1 is a schematic diagram in which the relative sizes and positional relationships of a plurality of constituent members are not accurately illustrated with respect to the actual objects. FIG. 1 illustrates a die sinking type wire electric discharge machining apparatus in which a workpiece is immersed in an oil-based electric discharge machining fluid and undergoes machining.

For convenience, with respect to a feeding direction 301 (indicated by an arrow in FIG. 1) of a wire electrode, a side (upstream side) where the wire electrode enters is simply referred to as the "upstream side," and a side (downstream side) where the wire electrode is discharged is simply referred to as the "downstream side."

First described is an overall configuration of the wire electric discharge machining apparatus according to an embodiment illustrated in FIG. 1. The wire electric discharge machining apparatus according to an embodiment includes at least a travel device 1, an automatic wire threader 2, a wire guide unit 3, a control device 91, a power supply 92, and a relative movement device 93. A portion where the travel device 1, the automatic wire threader 2, the wire guide unit 3, and the relative movement device 93 are provided is referred to as the main machine.

The travel device 1 is a device that feeds a wire electrode WE that has been unused for machining to a machining gap GP formed between the wire electrode WE and a workpiece WP, and collects the wire electrode WE that has been provided for machining and has been used. The travel device 1 includes a feeder 11, a tension device 12, a collection device 13 and a conveyance device 14. A range from the feeder 11 to an upper wire guide unit 3A via the tension device 12 and the automatic wire threader 2 is defined as a feed side 1A of the wire electrode WE, and a range from a lower wire guide unit 3B to the collection device 13 via the conveyance device 14 is defined as a collection side 1B of the wire electrode WE.

The automatic wire threader 2 is a device that automatically stretches the wire electrode WE. The automatic wire threader 2 of the wire electric discharge machining apparatus according to an embodiment includes a feed roller 2A, a guide pipe 2B, and a cutter 2C. The feed roller 2A is a member that is rotated by a delivery motor 2M and feeds the wire electrode WE. The guide pipe 2B is a member that guides a tip of the wire electrode WE to the upper wire guide unit 3A. The cutter 2C is a member that cuts the wire electrode WE. The cutter 2C can be replaced with, for example, another member that cuts the wire electrode WE, such as a heating roller that melts a wire electrode by heat.

The wire guide unit 3 includes the upper wire guide unit 3A and the lower wire guide unit 3B. The upper wire guide unit 3A and the lower wire guide unit 3B are each an assembly formed by integrating a wire guide (corresponding to a guide body) that positions and guides the wire electrode WE, a power conductor that supplies power to the wire electrode WE, and a machining fluid jet nozzle that supplies a jet of machining fluid to the machining gap GP.

The control device 91 is a device that controls an operation of the wire electric discharge machining apparatus. One or more signal lines are connected between each of the control device 91, the travel device 1, the automatic wire threader 2, the power supply 92, and the relative movement device 93, and a predetermined sequence operation is executed. The control device 91 controls a defoaming device 8. The control device 91 executes a specific operation of each device in accordance with a numerical control (NC) program, and includes a numerical value control device that arbitrarily controls an operation of the entire wire electric discharge machining apparatus to perform desired machining.

The power supply 92 is a device that continuously supplies a discharge current pulse having desired waveform and peak current value to the machining gap GP. The relative movement device 93 is a device that relatively moves the wire electrode WE and the workpiece WP in horizontal two-axis directions. The relative movement device 93 includes a taper device that tilts the wire electrode WE with respect to the workpiece WP.

The machining tank 4 is a member that accommodates the workpiece WP. The machining tank 4 is a member that accommodates the machining fluid. When machining is performed by a flushing method in which a jet of machining fluid is injected and supplied to the machining gap GP while the workpiece WP is exposed to the air, a machining tank wall prevents the machining fluid from scattering, and the machining tank 4 functions as a splash guard. When machining is performed by the die sinking method in which the workpiece WP is immersed in the machining fluid, the machining tank wall prevents the machining fluid from leaking, and the machining tank 4 literally functions as a tank.

A lower arm 5 is a member that supports the lower wire guide unit 3B at a tip portion. The lower arm 5 is attached and fixed to so as to be suspended from a mechanical structure (not illustrated) installed above a column 6 and outside the machining tank 4. A tip of the lower arm 5 is arranged to be located below the workpiece WP installed inside the machining tank 4. The lower arm 5 is provided to be movable relative to the machining tank 4. Hence, in the wire electric discharge machining apparatus according to an embodiment, since a structure is provided in which the lower arm 5 does not penetrate the machining tank wall on a back surface side of the machining tank 4, a sealing device that prevents leakage of machining fluid is not required between the lower arm 5 and the machining tank 4.

A direction change pulley 10 is rotatably attached to a guide block 20 fixedly provided at a tip of the lower arm 5 so as to be located directly below the lower wire guide unit 3B. The direction change pulley 10 changes a traveling direction of the wire electrode WE traveling perpendicularly to an installation surface of the workpiece WP into a direction of a winding device 13A located outside the machining tank 4. A plurality of direction change pulleys 10 can be provided in accordance with the movement path of the wire electrode WE.

Next, the travel device 1 in the wire electric discharge machining apparatus according to an embodiment will be described in more detail. The feeder 11 of the travel device 1 is a device that supplies the wire electrode WE to the machining gap GP. The feeder 11 includes a reel 11A, a wire bobbin 11B, a servo pulley 11F, and a servo motor 11M. However, the wire bobbin 11B is a replaceable consumable item having the wire electrode WE of a predetermined length wound around its axis and stored. The wire bobbin 11B is loaded onto the reel 11A and rotates.

The reel 11A is rotated by the servo motor 11M in accordance with a speed at which the tension device 12 continuously pulls out the wire electrode WE from the wire bobbin 11B. The servo motor 11M can be replaced with a brake composed of, for example, a torque motor or a powder clutch. The servo pulley 11F moves up and down. By controlling the servo motor 11M in accordance with a position of the servo pulley 11F in the up-down direction, rotation of the wire bobbin 11B is changed so that the wire electrode WE is relatively smoothly fed.

The tension device 12 is a device that lets out the wire electrode WE from the wire bobbin 11B and sequentially feeds the wire electrode WE to the machining gap GP. The tension device 12 is a device that applies a predetermined tension to the wire electrode WE supplied to the machining gap GP between the tension device 12 and the collection device 13. The tension device 12 includes a driving roller 12A, a driven roller 12B, a pinch roller 12C, and a servo motor 12M. A strain gauge 12T is a tension detector. A limit switch 12L is a disconnection detector. In the case of an apparatus configuration in which disconnection can be detected at the same time as tension by the tension detector, there is no need to provide the limit switch 12L.

The driving roller 12A serves both as a feed roller that pulls out the wire electrode WE from the wire bobbin 11B and feeds the wire electrode WE to the machining gap GP and as a tension roller that applies the predetermined tension to the wire electrode WE. The wire electrode WE is wound around so as to make a detour around an outer periphery of the driving roller 12A by the driven roller 12B and the pinch roller 12C. The driving roller 12A is rotated by the servo motor 12M. The control device 91 controls a rotation speed of the servo motor 12M based on the tension detected by the strain gauge 12T and maintains the tension constant.

The collection device 13 is a device that collects the used wire electrode WE. The collection device 13 is a device that causes the wire electrode WE to travel at a constant speed. The collection device 13 is able to separate the used wire electrode WE from a liquid and collect the used wire electrode WE. The collection device 13 includes the winding device 13A and a bucket 13B.

Figure 11:
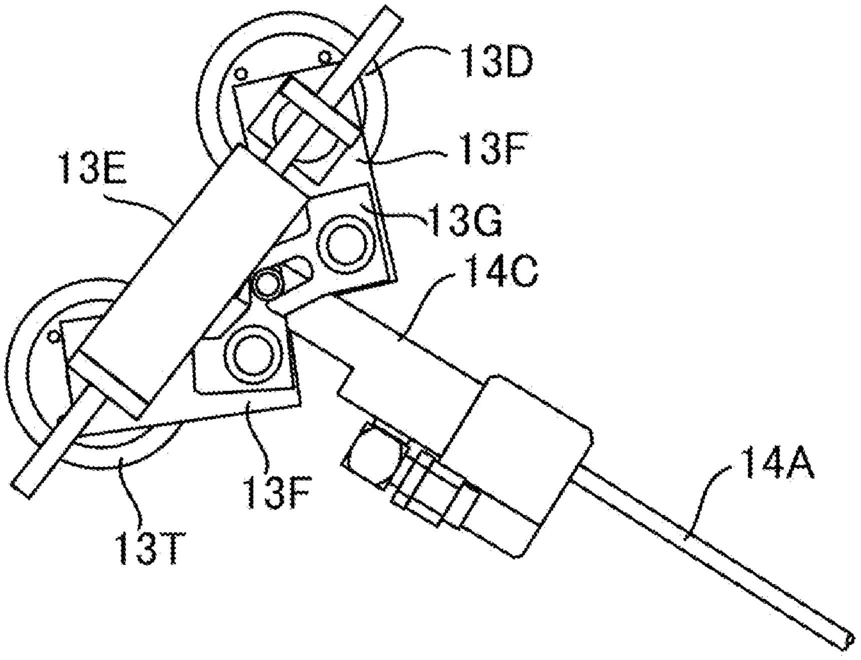
FIG. 11 schematically illustrates a structure of the winding device of the wire electric discharge machining apparatus according to the disclosure.

The winding device 13A of the collection device 13 includes a pair of rollers, namely, a driving roller 13D rotated on its axis by a winding motor 13M and a driven roller 13T in contact with and rotating in accordance with the driving roller 13D, as well as a second cylinder device 13E that opens and closes the pair of rollers 13D and 13T. The winding device 13A sandwiches the wire electrode WE between the pair of rollers 13D and 13T, and causes the wire electrode WE to travel at a constant travel speed. The pair of rollers 13D and 13T are each connected to the second cylinder device 13E on the back thereof as illustrated in FIG. 11. By driving the second cylinder device 13E and moving the pair of rollers 13D and 13T in directions of approaching and separating from each other, the pair of rollers 13D and 13T are freely opened and closed. When the pair of rollers 13D and 13T are open, the wire electrode WE is released from restraint, and at the same time, an obstacle can be substantially removed from the travel path (movement path) of the wire electrode WE.

The winding device 13A is provided so as to be located outside the machining tank 4, and the pair of rollers 13D and 13T are provided centering on the movement path of the wire electrode WE via a connection member 13F in the vicinity of an outlet of the wire electrode WE of a fourth communication path 14P on the upstream side of the second discharge device 14C.

Figure 14:
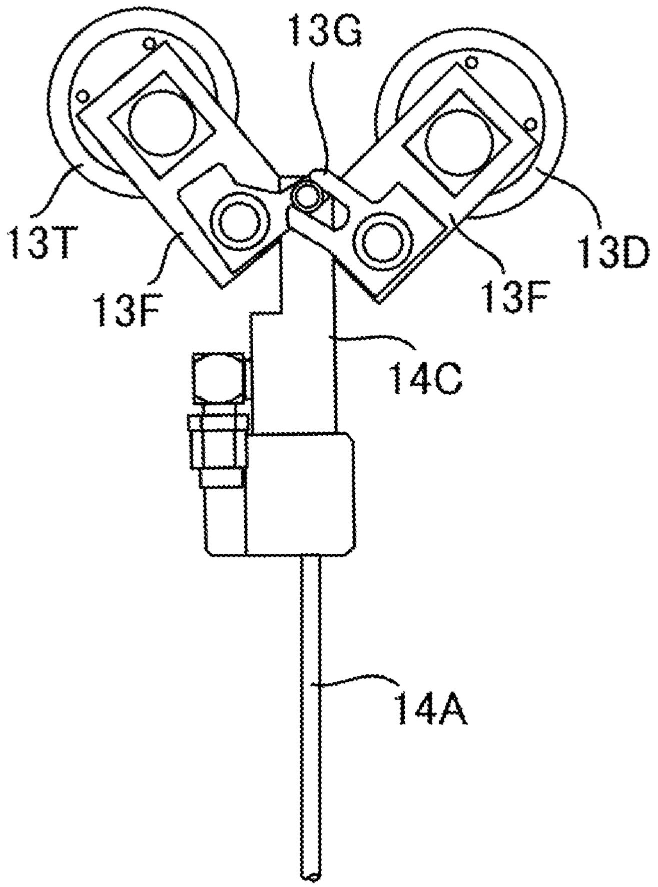
FIG. 14 schematically illustrates a structure of the winding device of the wire electric discharge machining apparatus according to the disclosure.

As illustrated in FIG. 14, the pair of rollers 13D and 13T are each attached to the connection member 13F, and are attached to the wire electric discharge machining apparatus via the connection member 13F. The rollers 13D and 13T are connected by a link mechanism 13G attached to the connection member 13F.

The second cylinder device 13E is specifically an electric cylinder, an air cylinder, or a hydraulic cylinder. In the case where the second cylinder device 13E is an electric cylinder, the second cylinder device 13E includes a motor, a ball screw, a nut fitted into the ball screw, a rod fixed to the nut, and a frame storing the above. By driving the motor and rotating the ball screw, the nut and the rod are reciprocally moved within the frame. In the case where the second cylinder device 13E is a hydraulic cylinder, the second cylinder device 13E includes a frame, a piston provided within the frame, a rod fixed to the piston, and a hydraulic pump supplying pressure oil into the frame. By supplying the pressure oil from the hydraulic pump into the frame, the piston and the rod are reciprocally moved within the cylinder.

The connection member 13F for the roller 13D is attached to a tip of the rod, and the connection member 13F for the roller 13T is attached to an end of the frame. When the rod advances within the frame, the connection member 13F moves, and the rollers 13D and 13T are separated from each other. On the other hand, when the rod retreats within the frame, the connection member 13F moves, and the rollers 13D and 13T come into close contact.

The winding motor 13M that rotates the driving roller 13D maintains a predetermined rotation speed that is higher than the rotation speed of the servo motor 12M of the tension device 12. Due to a difference in speed between the driving roller 12A of the tension device 12 and the winding device 13A, while the wire electrode WE travels at a predetermined travel speed, a tension of a magnitude corresponding to the difference in speed between the driving roller 12A and the winding device 13A is applied to the wire electrode WE.

The bucket 13B of the collection device 13 is a collection box that collects the wire electrode WE. The bucket 13B is provided with, for example, a drainer plate 13C such as a wire mesh. The bucket 13B is able to separate the machining fluid that adheres to the wire electrode WE and is discharged from a tip of a suction nozzle 14N or the outlet of the wire electrode WE of a third communication path from the wire electrode WE, and collect the machining fluid. When it is desired to cut the wire electrode WE into small pieces and collect the same, the drainer plate 13C can be replaced with a fine filter.

The bucket 13B is installed so as to be located below the suction nozzle 14N described later. The reason is to collect a small amount of machining fluid that may drip from the tip of the suction nozzle 14N after a wire threading operation in wire threading work of the wire electrode WE, especially an ultrafine one having a diameter of ø0.1 mm or less.

Figure 2:
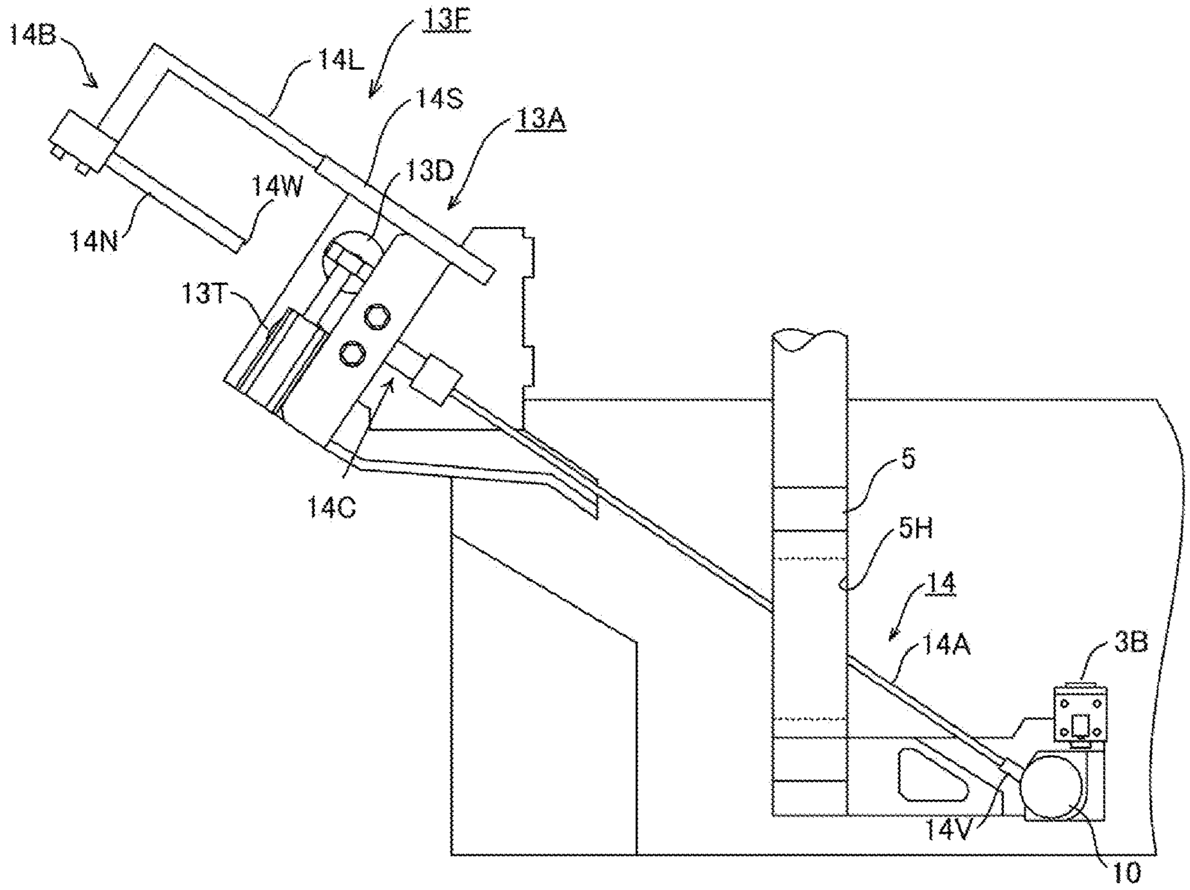
FIG. 2 schematically illustrates a conveyance device of the wire electric discharge machining apparatus according to the disclosure.
Figure 3:
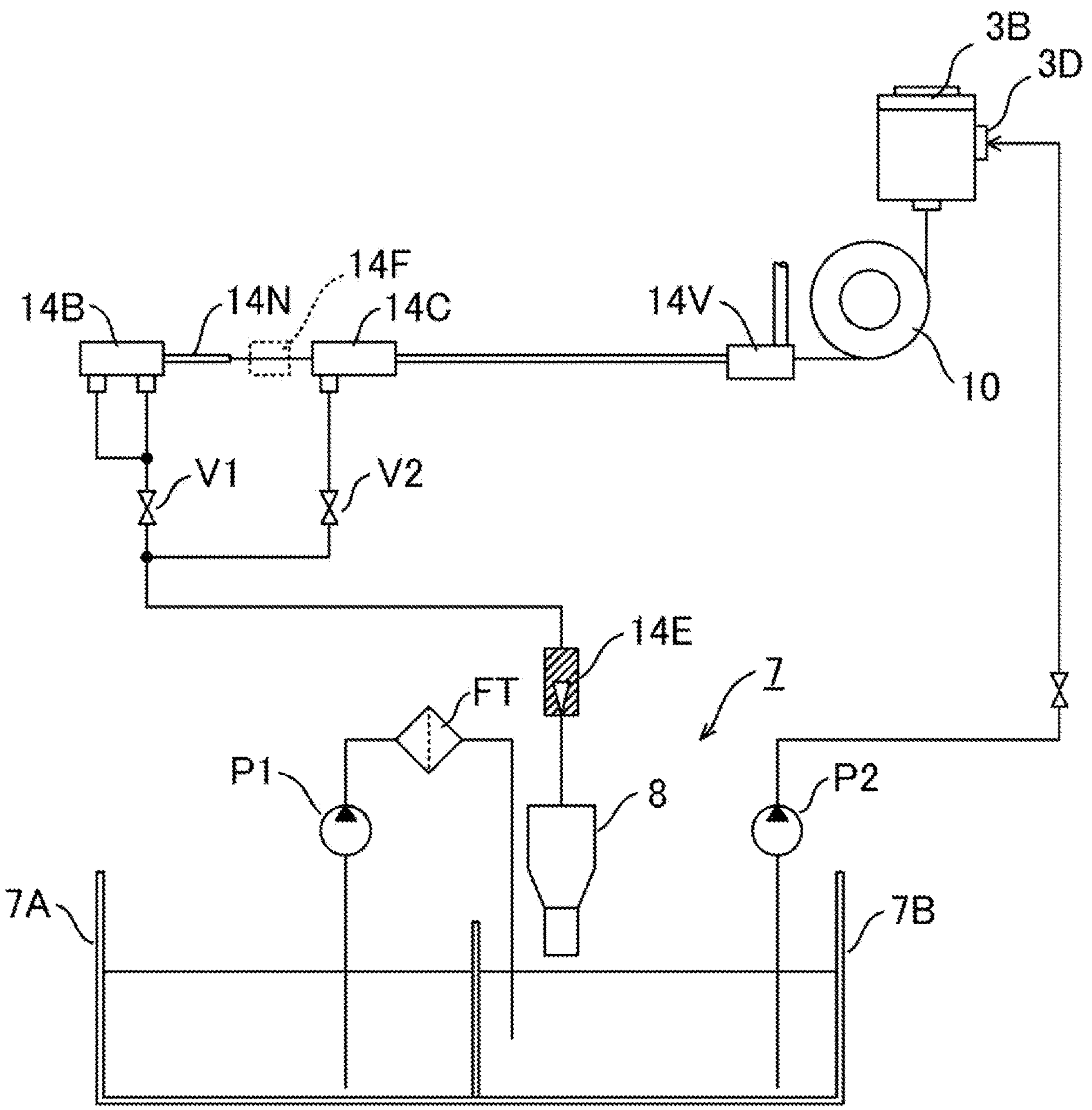
FIG. 3 illustrates a circuit configuration of a suction device and a defoaming device provided in the conveyance device of the wire electric discharge machining apparatus according to the disclosure.

FIG. 2 illustrates a dominant embodiment of a conveyance device of the wire electric discharge machining apparatus according to the disclosure. Like FIG. 1, FIG. 2 is a schematic diagram in which the relative sizes and positional relationships of a plurality of constituent members are not accurately illustrated with respect to the actual objects. FIG. 3 schematically illustrates a simplified circuit supplying and discharging the gas-liquid mixed fluid in the conveyance device. A specific configuration of the conveyance device is described below with reference to FIG. 1 to FIG. 3. In FIG. 3, illustrations and descriptions of members not directly related to the disclosure are omitted.

The conveyance device 14 is a device that leads the used wire electrode WE whose direction has been changed to upward by the direction change pulley 10 to the outside of the machining tank 4. The conveyance device 14 includes a guide pipe 14A, a first discharge device 14B, a second discharge device 14C, a blower 14F, the defoaming device 8 illustrated in FIG. 3, and a suction device 14E.

Specifically, the first discharge device 14B and the second discharge device 14C of the conveyance device 14 in the wire electric discharge machining apparatus according to an embodiment are each connected to the suction device 14E provided near the machining fluid storage tank 7. Negative pressure is generated by supply of the machining fluid to the suction device 14E, and the machining fluid that contains bubble is suctioned via the first discharge device 14B or the second discharge device 14C and discharged to a clean fluid tank 7B.

Figure 8:
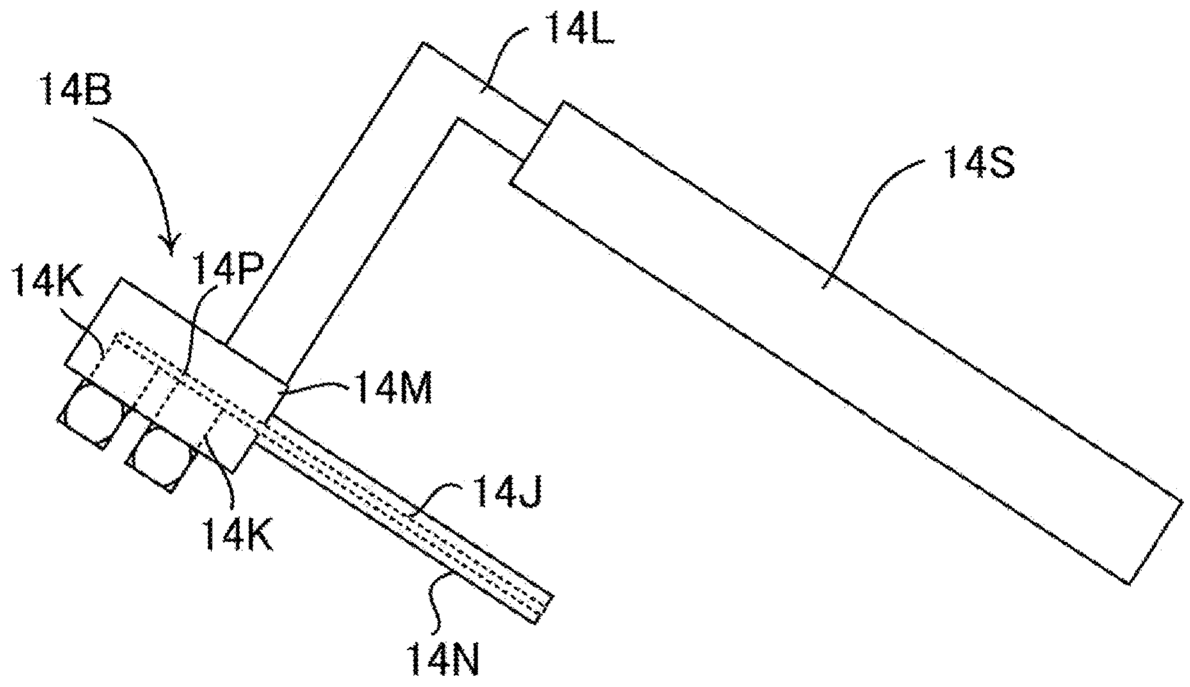
FIG. 8 schematically illustrates a structure of a first discharge device of the wire electric discharge machining apparatus according to the disclosure.

FIG. 8 is a schematic diagram illustrating a structure of the first discharge device 14B. In FIG. 8, for convenience, the internal structure is shown in dotted lines so that structures of the suction nozzle 14N and a connecting member 14M can be understood.

The first discharge device 14B includes the connecting member 14M, the suction nozzle 14N, a first cylinder device 14S, and an arm 14L. The first discharge device 14B causes the winding device 13A to capture the wire electrode WE together with the gas-liquid mixed fluid, and guides the wire electrode WE to the rear of the winding device 13A as illustrated in FIG. 1.

The suction nozzle 14N is a cylindrical member, and includes therein a penetrating second communication path 14J of a linear shape for insertion of the wire electrode WE and the gas-liquid mixed fluid therethrough. The connecting member 14M is connected to an outlet side of the wire electrode WE of the suction nozzle 14N.

The connecting member 14M includes therein the fourth communication path 14P of a linear shape allowing the wire electrode WE and the gas-liquid mixed fluid to pass therethrough, and a first discharge path 14K allowing the gas-liquid mixed fluid to pass therethrough. The downstream side of the second communication path 14J and the upstream side of the fourth communication path 14P are connected. The first discharge path 14K has one end connected to the fourth communication path 14P and the other end connected to the suction device 14E.

A suction port 14W of the suction nozzle 14N is provided on an outlet side of the wire electrode WE of the winding device 13A. The suction nozzle 14N is provided coaxially with the first communication path 14R of the guide pipe 14A so that the suction port 14W is on the movement path of the wire electrode WE.

One end of the arm 14L is connected to a side of the connecting member 14M opposite to the first discharge path 14K. The other end of the arm 14L is fixed to the first cylinder device 14S, for example, to a rod of the first cylinder device 14S. Due to the action of the first cylinder device 14S, the arm 14L, the connecting member 14M, and the suction nozzle 14N integrally reciprocally move.

The suction nozzle 14N reciprocally moves linearly from an initial position to an advancement limit position, the initial position being a position where the suction nozzle 14N does not hinder the discharge of the wire electrode WE and being coaxial with the first communication path 14R of the guide pipe 14A, the advancement limit position being a position where the suction port 14W of the suction nozzle 14N approaches or contacts an outlet of a third communication path 14G of the second discharge device 14C.

The arm 14L is a member for connecting the first cylinder device 14S with the connecting member 14M and the suction nozzle 14N, and is of, for example, an L-shape.

The suction nozzle 14N advances along the movement path of the wire electrode WE. When the pair of rollers 13D and 13T of the winding device 13A are in the open state, the suction nozzle 14N passes between the pair of rollers 13D and 13T and is connected to the outlet of the third communication path 14G of the second discharge device 14C. Thereafter, the gas-liquid mixed fluid and the tip of the wire electrode WE fed together with the gas-liquid mixed fluid are suctioned and the tip of the wire electrode WE is captured. At this time, the suction nozzle 14N stops suctioning the wire electrode WE and the gas-liquid mixed fluid. As the suction nozzle 14N retreats to its original position, the winding device 13A sandwiches the wire electrode WE. Then, when the first discharge device 14B has retreated to its original position, automatic wire threading is completed. The gas-liquid mixed fluid suctioned by the first discharge device 14B and the second discharge device 14C by the suction device 14E is discharged to the defoaming device 8.

The first cylinder device 14S is specifically an electric cylinder, an air cylinder, or a hydraulic cylinder. In the case where the first cylinder device 14S is an electric cylinder, the first cylinder device 14S includes a motor, a ball screw, a nut fitted into the ball screw, a rod fixed to the nut, and a frame storing the above. By driving the motor and rotating the ball screw, the nut and the rod are reciprocally moved within the frame. In the case where the first cylinder device 14S is a hydraulic cylinder, the first cylinder device 14S includes a cylinder tube, a piston provided within the cylinder tube, a rod fixed to the piston, and a hydraulic pump supplying pressure oil into the cylinder tube. By supplying the pressure oil from the hydraulic pump into the cylinder tube, the piston and the rod are reciprocally moved within the cylinder.

Figure 9:
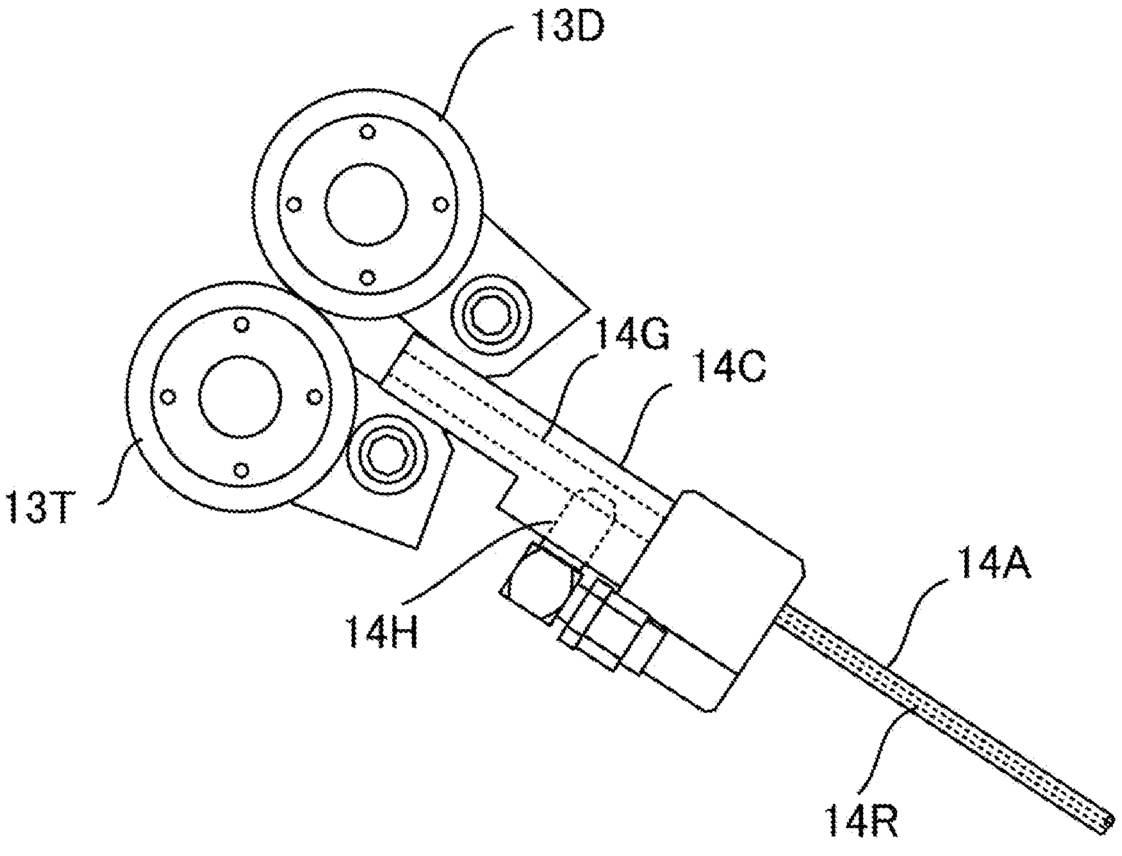
FIG. 9 schematically illustrates a structure of a second discharge device of the wire electric discharge machining apparatus according to the disclosure.

FIG. 9 is a schematic diagram illustrating a structure of the second discharge device 14C. In FIG. 9, for convenience, the internal structure is shown in dotted lines so that the structures of the second discharge device 14C and the guide pipe 14A can be understood.

The second discharge device 14C is a member for connecting the suction device 14E to the guide pipe 14A, and includes therein the third communication path 14G of a linear shape allowing the wire electrode WE and the gas-liquid mixed fluid to pass therethrough, and a second discharge path 14H allowing the gas-liquid mixed fluid to pass therethrough. The second discharge path 14H has one end connected to the third communication path 14G and the other end connected to the suction device 14E.

One downstream end of the guide pipe 14A is connected to an inlet side of the wire electrode WE of the second discharge device 14C. The first communication path 14R of the guide pipe 14A and the third communication path 14G of the second discharge device 14C are connected. The first communication path 14R of the guide pipe 14A and the third communication path 14G of the second discharge device 14C are provided coaxially and communicate linearly.

The pair of rollers 13D and 13T are provided centering on the movement path of the wire electrode WE on the upstream side of the second discharge device 14C.

The second discharge device 14C discharges the tip of the wire electrode WE from the outlet of the wire electrode WE of the third communication path 14G, causes the winding device 13A to capture the wire electrode WE, and guides the wire electrode WE to the rear of the winding device 13A as illustrated in FIG. 1.

The first discharge device 14B and the second discharge device 14C are selectively operated. The first discharge device 14B operates when the wire electrode WE has a relatively small diameter. At this time, the second discharge device 14C is not used. The second discharge device 14C is used when the wire electrode WE has a relatively large diameter. At this time, the first discharge device 14B does not operate. The control device 91 switches between a control valve V1 connected between the first discharge path 14K and the suction device 14E and a control valve V2 provided between the second discharge path 14H and the suction device 14E, and switches between the first discharge device 14B and the second discharge device 14C.

The guide pipe 14A is provided between the direction change pulley 10 and the winding device 13A along the movement path of the wire electrode WE, and is inclined with reference to a horizontal direction in the case where the wire electric discharge machining apparatus is installed. Specifically, an inclination angle of the guide pipe 14A is, for example, 13 degrees, with reference to the horizontal direction of the wire electric discharge machining apparatus.

The guide pipe 14A is a long cylindrical member that guides the movement of the wire electrode WE between the direction change pulley 10 and the winding device 13A, and includes therein the first communication path 14R for insertion of the wire electrode WE therethrough. The guide pipe 14A has antistatic properties. An inner surface that constitutes the first communication path 14R of the guide pipe 14A is made as smooth as possible.

When the wire electrode WE is fed from the bottom to the top, a sufficient force to lift the wire electrode is required compared to when the wire electrode WE moves horizontally. Originally, when the wire electrode WE and the inner surface of the guide pipe 14A come into contact with each other and friction occurs, static electricity is generated. In particular, when the wire electrode WE is an ultrafine wire electrode having a diameter of ø0.1 mm or less, the wire electrode WE becomes likely to stick to the inner surface of the guide pipe 14A due to a charged electrostatic force.

In the wire electric discharge machining apparatus according to the disclosure, since the guide pipe 14A of the conveyance device 14 has antistatic properties, it can be prevented that the wire electrode WE sticks to the inner surface of the guide pipe 14A due to electrostatic force. Since the inner surface of the guide pipe 14A is smooth, friction between the wire electrode WE and the guide pipe 14A is small, and the wire electrode WE is unlikely to get caught on the inner surface of the guide pipe 14A.

The guide pipe 14A is desirably obtained by containing a conductive antistatic material in a material having high electrical insulation in order to maintain antistatic properties for a long period of time. In the case of an electrically insulating material, it is difficult to remove static electricity by grounding. Although the guide pipe 14A whose surface is coated with an antistatic material can be used, there is a risk that the necessary and sufficient antistatic properties may be lost in a relatively short period of time. The guide pipe 14A is desirably made of a material having a smooth inner surface and wear resistance. For example, conductive mullite ceramics are effective as a material having antistatic properties, a smooth inner surface and wear resistance.

The suction device 14E is a device that suctions the gas-liquid mixed fluid. Specifically, an ejector, an aspirator, or a vacuum generator may be used.

Figure 10:
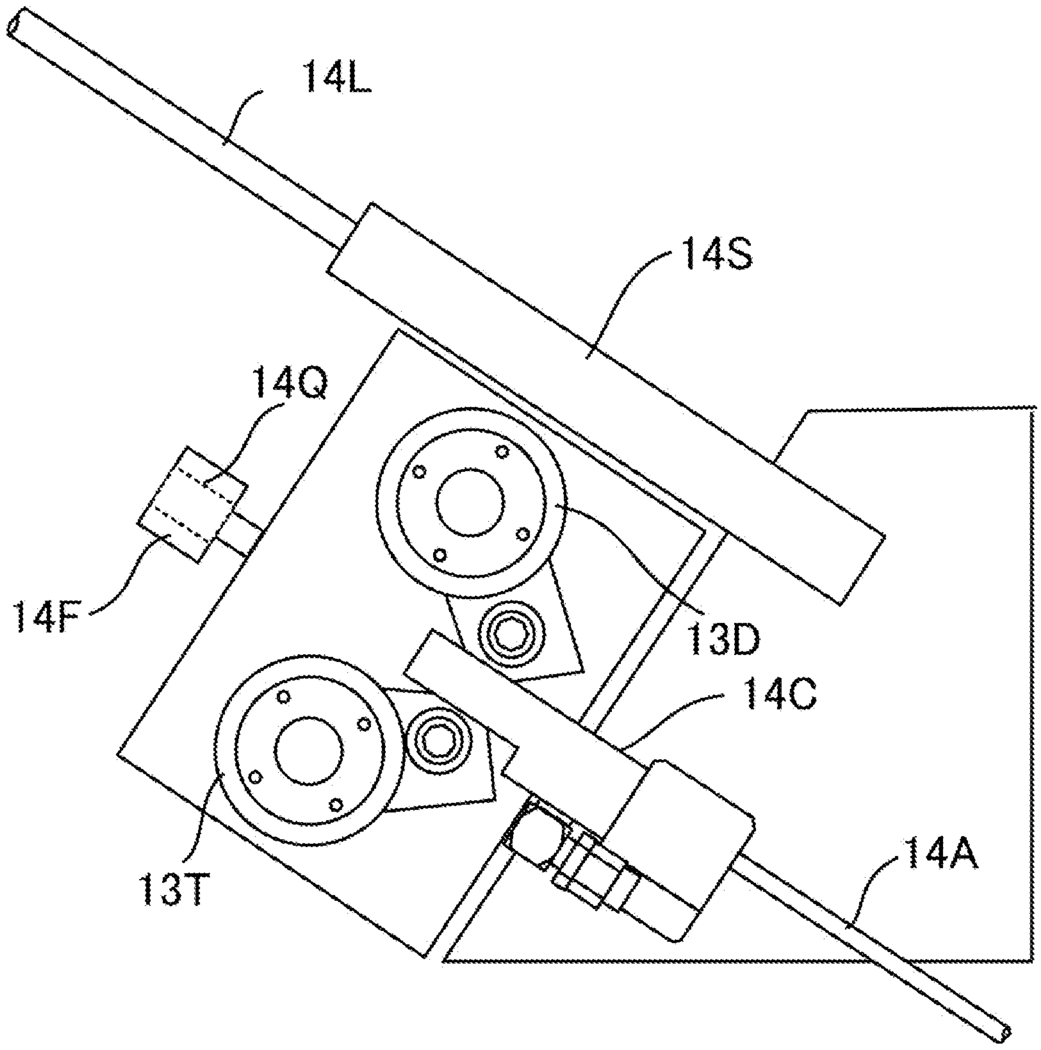
FIG. 10 schematically illustrates a structure of a blower of the wire electric discharge machining apparatus according to the disclosure.

FIG. 10 is a schematic diagram illustrating a structure of the blower 14F. In FIG. 10, for convenience, the internal structure is shown in dotted lines so that the structure of the blower 14F can be understood.

The blower 14F is a member that, in order to prevent the ultrafine wire electrode WE that passes between the pair of rollers 13D and 13T of the winding device 13A from sticking to a roller surface by a force of air, creates a layer of air between the wire electrode WE and the roller surface.

The blower 14F is a cylindrical member having a through hole 14Q therein, and has a central axis provided coaxially with the movement path of the wire electrode WE.

If the first discharge device 14B is used for wire threading work, the suction nozzle 14N moves along the movement path of the wire electrode WE and is inserted through the through hole 14Q of the blower 14F.

The gas-liquid mixed fluid discharged from the first discharge path 14K and the second discharge path 14H is introduced into the defoaming device 8 via the suction device 14E. The defoaming device 8 according to an embodiment is, for example, a cyclone type defoaming device. The defoaming device 8 introduces the gas-liquid mixed fluid into a container at high speed so as to create a vortex flow, leads the air out from a top side of the container, and leads the machining fluid having a high specific gravity out from a bottom side of the container. The machining fluid is returned to the clean fluid tank 7B of the machining fluid storage tank 7. By defoaming the gas-liquid mixed fluid, obstacles caused by the bubble-containing machining fluid can be prevented. For example, calibration can be prevented and the machining fluid can be safely reused.

As illustrated in FIG. 3, the machining fluid storage tank 7 that supplies and collects the machining fluid in the main machine of the wire electric discharge machining apparatus includes at least a dirty fluid tank 7A and the clean fluid tank 7B. In the machining fluid storage tank 7, dirty machining fluid collected by the dirty fluid tank 7A can be purified and stored as it is in the clean fluid tank 7B. The purified machining fluid is provided for machining and is used in generating a new gas-liquid mixed fluid.

In the machining fluid storage tank 7, the machining fluid in the dirty fluid tank 7A is delivered to the clean fluid tank 7B by a pump P1 through a filter FT. In the machining fluid delivered from the clean fluid tank 7B to a machining fluid inlet 3D in the lower wire guide unit 3B by a pump P2, the machining fluid spouted downward passes through the direction change pulley 10 and reaches the gas-liquid mixing port 14V connected to one upstream end of the guide pipe 14A. An air flow flows in from the gas-liquid mixing port 14V due to the action of the suction device 14E. The air passes through a tube from above the direction change pulley 10 and reaches the gas-liquid mixing port 14V. Negative pressure is generated by the machining fluid suctioned by the suction device 14E, the air is mixed into the machining fluid, and the gas-liquid mixed fluid flows in from the inlet of the wire electrode WE of the first communication path 14R.

Originally, compared to a liquid, a gas has a smaller force to move the wire electrode WE. On the other hand, in the case where the wire electrode WE is carried by a liquid flow and moved, the wire electrode WE is likely to stick to the smooth inner surface of the guide pipe 14A due to surface tension. In the disclosure, it has been found that a gas-liquid mixed fluid has a higher conveyance capacity than a liquid, especially when the wire electrode WE is an ultrafine wire. When the wire electrode WE is an ultrafine wire, according to the gas-liquid mixed fluid, the wire electrode WE is unlikely to stick to the inner surface of the guide pipe 14A, and straightness is imparted.

The gas-liquid mixed fluid seems to be able to relatively well move the wire electrode WE in a state in which air becomes bubbles and is mixed evenly in the machining fluid as much as possible. However, for example, even in a state in which the machining fluid and air are separated into two layers, in view of the point that the wire electrode WE can be relatively well moved, effects are still maintained.

(Automatic Wire Threading Method Using First Discharge Device)

Next, an operation of the wire electric discharge machining apparatus according to an embodiment during automatic wire threading will be specifically described with reference to FIG. 1 to FIG. 5D. FIG. 4A to FIG. 4B and FIG. 5A to FIG. 5D extract and illustrate a portion from the conveyance device illustrated in FIG. 2 where the wire electrode in the winding device is wound up and collected. When the same reference numerals are given to the respective components illustrated in FIG. 1 to FIG. 5D, it indicates that they are the same components.

Figure 4A:
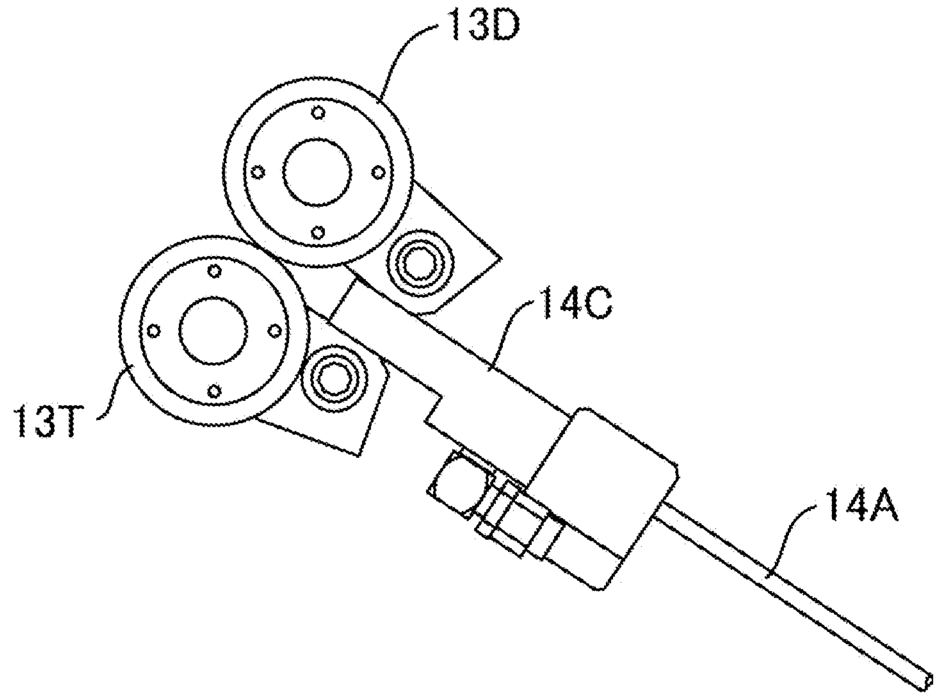
FIG. 4A and FIG. 4B illustrate an operation of a winding device and the conveyance device of the wire electric discharge machining apparatus according to the disclosure.
Figure 5A:
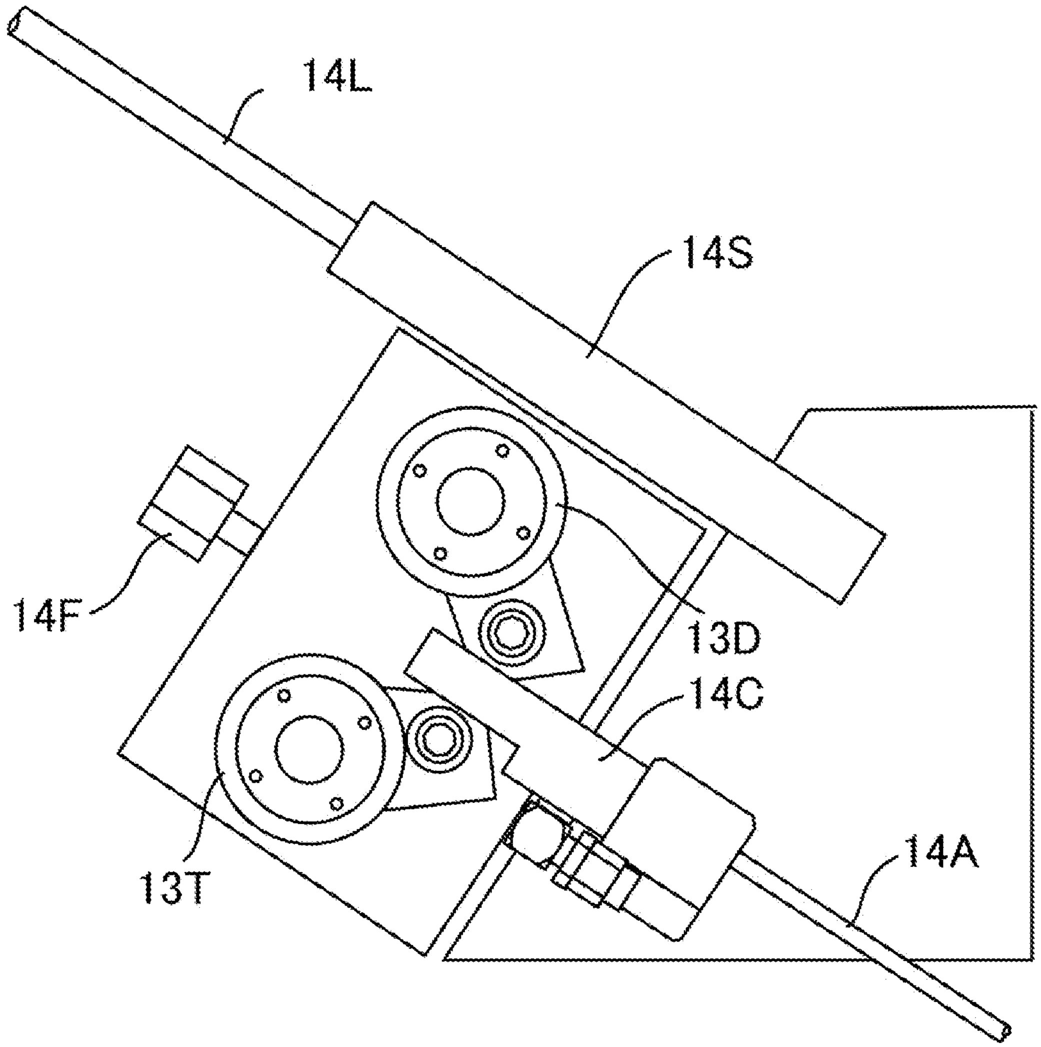
FIG. 5A to FIG. 5D illustrate an operation of the winding device and the conveyance device of the wire electric discharge machining apparatus according to the disclosure.

Immediately before start of automatic wire threading, the tip of the wire electrode WE is located at least closer to the machining gap GP than the feed roller 2A of the automatic wire threader 2 illustrated in FIG. 1. As illustrated in FIG. 5A, by driving the second cylinder device 13E, the control device 91 opens the pair of rollers 13D and 13T of the winding device 13A of the collection device 13 which are in a state of being closed and in contact with each other as illustrated in FIG. 4A.

Figure 4B:
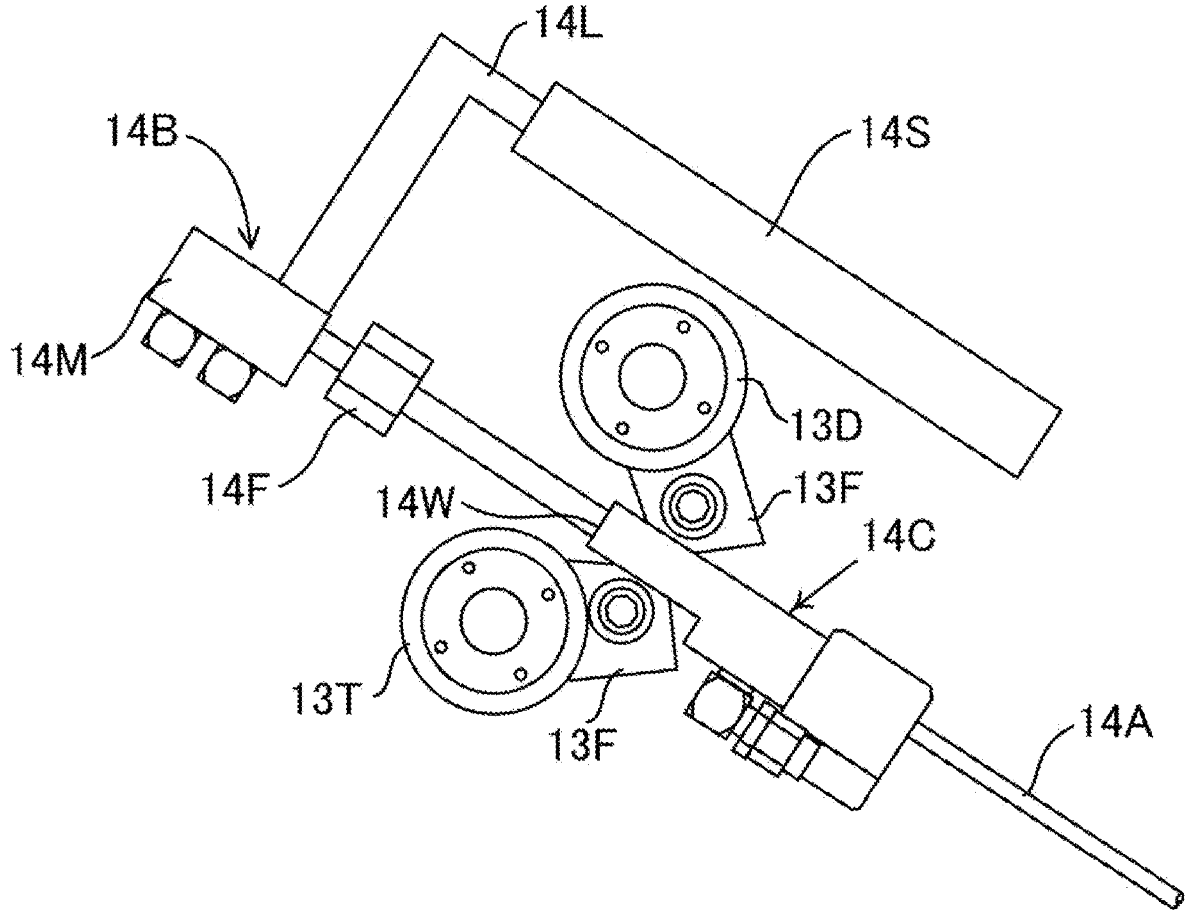

Next, as illustrated in FIG. 4B, the control device 91 drives the first cylinder device 14S of the conveyance device 14 to cause the suction nozzle 14B of the first discharge device 14B to advance. The term "advance" here indicates to move in a direction opposite to the feeding direction 301 of the wire electrode WE.

The suction nozzle 14N passes through the through hole 14Q of the blower 14F. Furthermore, when the suction nozzle 14N has passed between the pair of rollers 13D and 13T and advanced to the position where the suction port 14W of the suction nozzle 14N approaches or contacts the outlet of the third communication path 14G of the second discharge device 14C, the movement of the suction nozzle 14N is stopped.

As automatic wire threading is started, the control device 91 supplies compressed air into the guide pipe 2B of the automatic wire threader 2 while the guide pipe 2B of the automatic wire threader 2 is arranged at a predetermined height position.

The control device 91 operates the suction device 14E to take in the machining fluid from the machining fluid inlet 3D and take in air from the gas-liquid mixing port 14V, and mixes the air into the machining fluid, thereby generating the gas-liquid mixed fluid. The gas-liquid mixed fluid flows through the first communication path 14R, the third communication path 14G, the second communication path 14J and the fourth communication path 14P in order.

Furthermore, the gas-liquid mixed fluid flows into the defoaming device 8 from the first discharge path 14K via the suction device 14E. The defoaming device 8 defoams the gas-liquid mixed fluid that has flowed in, and discharges the machining fluid to the clean fluid tank 7B of the machining fluid storage tank 7.

As automatic wire threading is started, the control device 91 rotates the feed roller 2A of the automatic wire threader 2 at a predetermined rotation speed in a feeding direction. The control device 91 lowers the guide pipe 2B in accordance with the movement of the wire electrode WE. Since a flow of compressed air is generated in the guide pipe 2B, the wire electrode WE whose tip faces downward reaches the upper wire guide unit 3A while being guided by the guide pipe 2B without getting caught on an inner wall of the guide pipe 2B.

The wire electrode WE in which the tip of the wire electrode WE reaches the lower wire guide unit 3B and has passed through a lower wire guide reaches a groove-shaped movement path formed between the direction change pulley 10 and the guide block 20 without deviating from the travel path formed in the guide block 20.

Figure 5B:
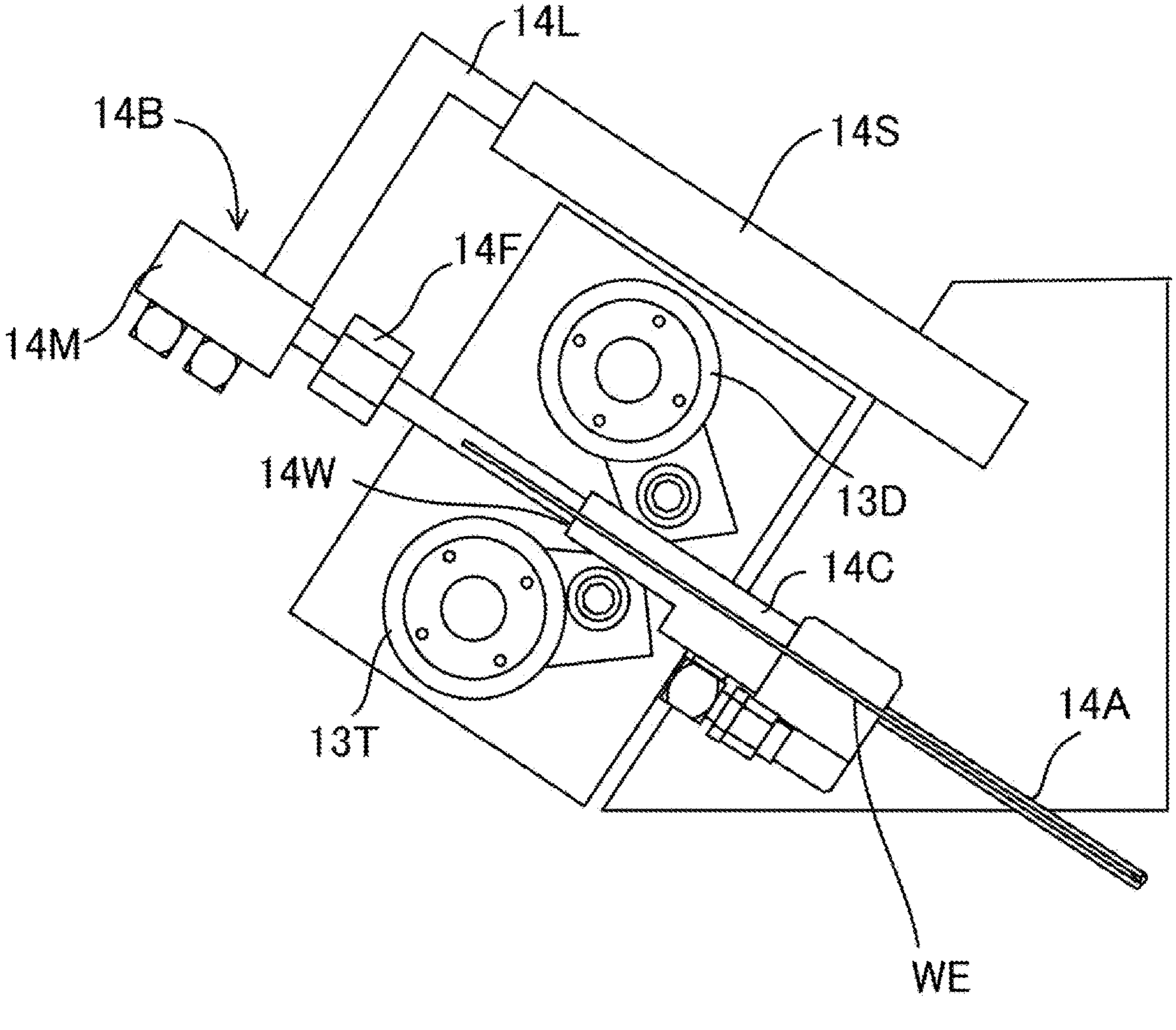

When the tip of the wire electrode WE reaches the gas-liquid mixing port 14V, the wire electrode WE is carried on the gas-liquid mixed fluid in the first communication path 14R of the guide pipe 14A and is sucked up from the bottom to the top. As illustrated in FIG. 5B, the wire electrode WE is carried on the flow of the gas-liquid mixed fluid, passes through the first communication path 14R and the third communication path 14G at once without buckling halfway, and reaches the second communication path 14J.

Figure 5C:
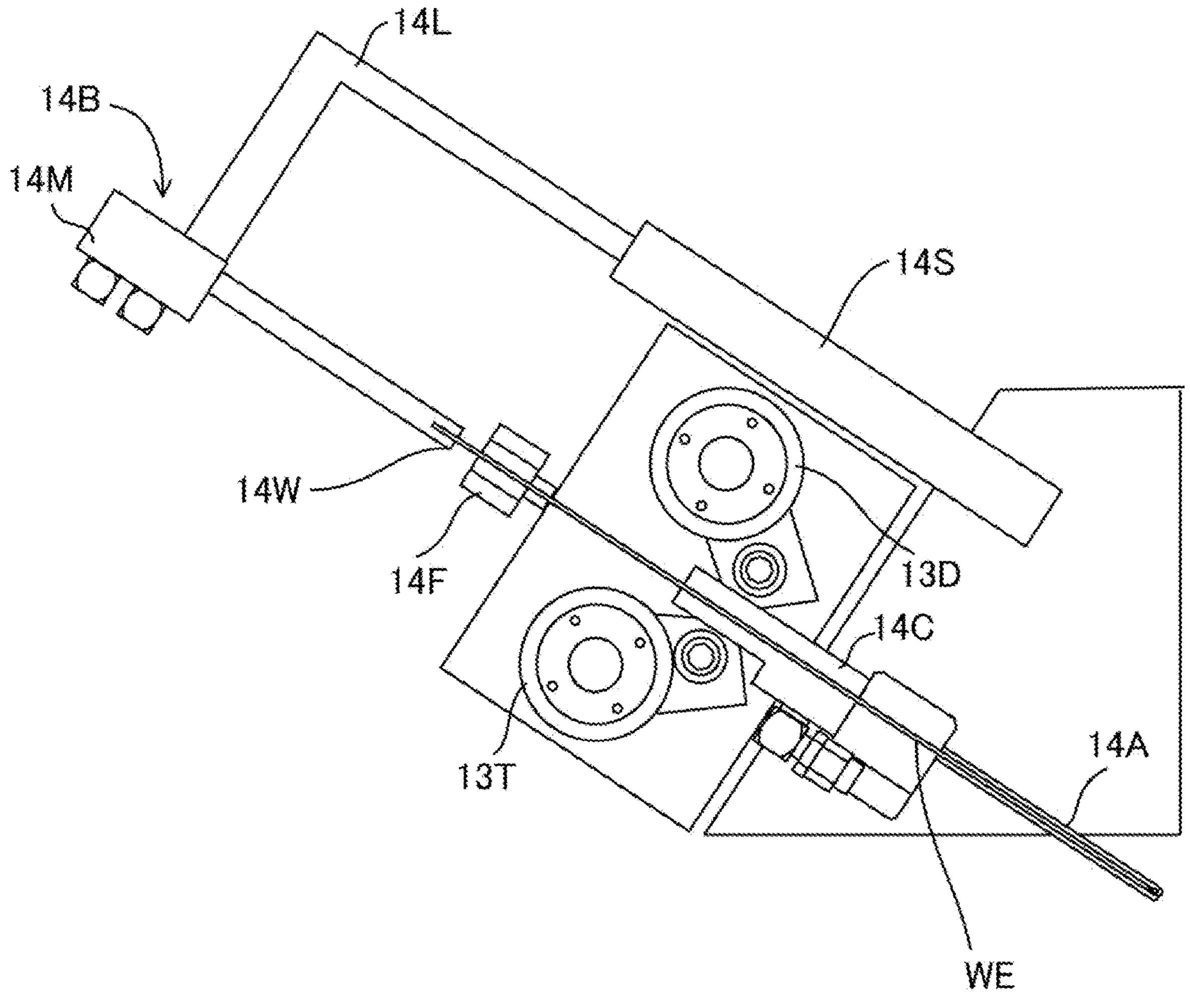

When a sensor (not illustrated) detects that the wire electrode WE has passed between the pair of rollers 13D and 13T of the winding device 13A, as illustrated in FIG. 5C, the control device 91 drives the first cylinder device 14S of the conveyance device 14 to cause the suction nozzle 14N to retreat integrally with the first discharge device 14B. The term "retreat" here indicates to move in the feeding direction 301 of the wire electrode WE.

When the suction nozzle 14N has passed between the pair of rollers 13D and 13T and retreated to the initial position, the control device 91 stops the movement of the suction nozzle 14N.

Figure 5D:
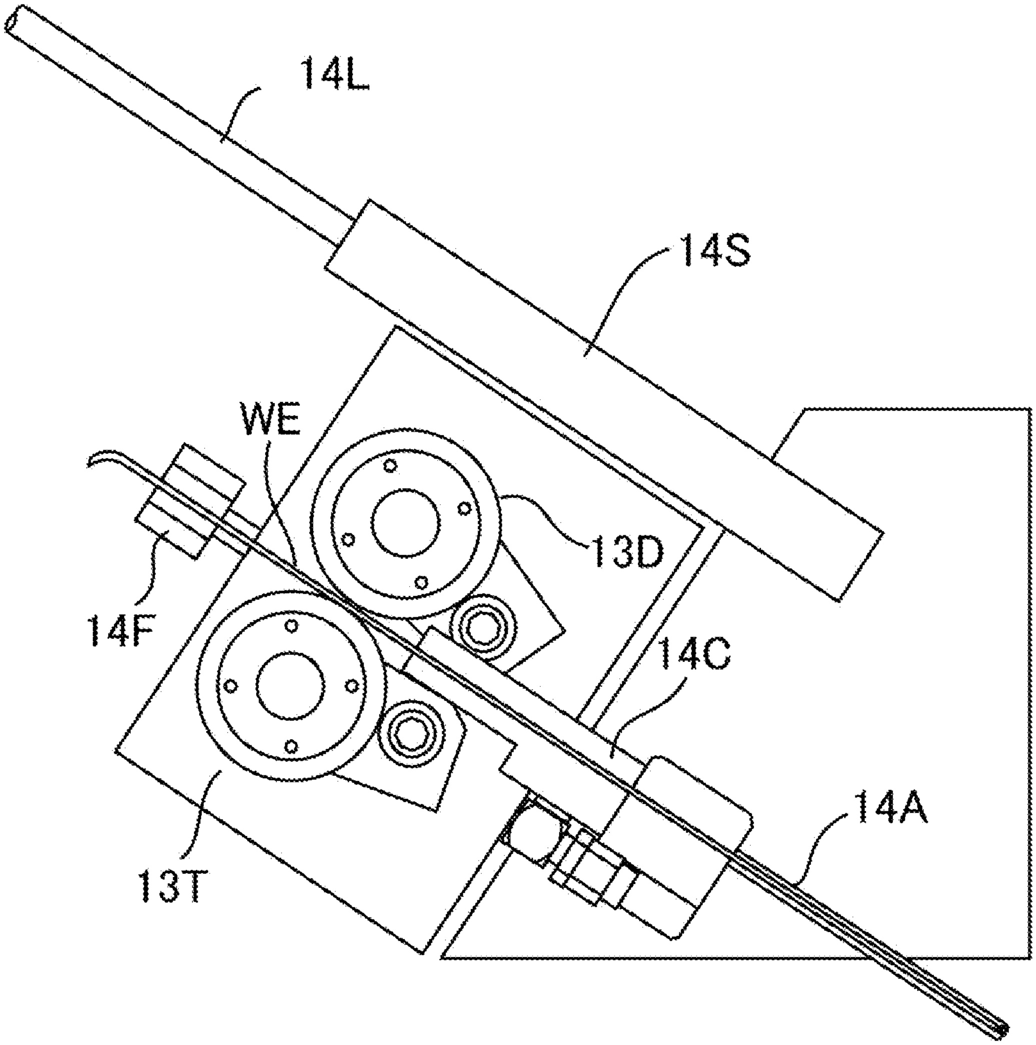

Next, as illustrated in FIG. 5D, the control device 91 drives the second cylinder device 13E to close the pair of rollers 13D and 13T of the winding device 13A and cause the pair of rollers 13D and 13T to sandwich the wire electrode WE.

After the automatic wire threading is completed, the control device 91 returns the automatic wire threader 2 to the initial position and resumes machining. At the time of completion of automatic wire threading, the control device 91 stops operation of the first discharge device 14B, the defoaming device 8 and the conveyance device 14.

(Automatic Wire Threading Method Using Both First Discharge Device and Second Discharge Device)

Next, an operation of the wire electric discharge machining apparatus according to an embodiment during automatic wire threading using the first discharge device 14B and the second discharge device 14C will be specifically described.

The control device 91 acquires a diameter value of the wire electrode WE from information about the wire electrode WE input by an operator using a display input device 94 or from information about the wire electrode WE automatically determined by the wire electric discharge machining apparatus. If the acquired diameter value of the wire electrode WE is greater than or equal to a reference value, the control device 91 determines to use the second discharge device 14C; if the diameter value of the wire electrode WE is less than the reference value, the control device 91 determines to use the first discharge device 14B. The control device 91 switches between the control valve V1 connected between the first discharge path 14K and the suction device 14E and the control valve V2 provided between the second discharge path 14H and the suction device 14E, and switches between the first discharge device 14B and the second discharge device 14C.

In the case of using the first discharge device 14B, the control device 91 opens the control valve V1 connected between the first discharge path 14K and the suction device 14E, and closes the control valve V2 provided between the second discharge path 14H and the suction device 14E.

The subsequent automatic wire threading method in the case of using the first discharge device 14B is as described in the section "(Automatic Wire Threading Method Using First Discharge Device)", and the description thereof is thus omitted.

The operation until the tip of the wire electrode WE reaches the lower wire guide unit 3B is also as described in the section "(Automatic Wire Threading Method Using First Discharge Device)", and the description thereof is thus omitted.

In the case of using the second discharge device 14C, the control device 91 closes the control valve V1 connected between the first discharge path 14K and the suction device 14E, and opens the control valve V2 provided between the second discharge path 14H and the suction device 14E.

As illustrated in FIG. 4A, the control device 91 drives the second cylinder device 13E to maintain a state in which the pair of rollers 13D and 13T of the winding device 13A are closed and are in contact with each other. The first discharge device 14B is stopped at the initial position.

The control device 91 operates the suction device 14E of the conveyance device 14 to take in the machining fluid from the machining fluid inlet 3D and take in air from the gas-liquid mixing port 14V, and mixes the air into the machining fluid, thereby generating the gas-liquid mixed fluid. The gas-liquid mixed fluid flows through the first communication path 14R and the third communication path 14G in order.

Furthermore, the gas-liquid mixed fluid flows into the defoaming device 8 from the second discharge path 14H via the suction device 14E. The defoaming device 8 defoams the gas-liquid mixed fluid that has flowed in, and discharges the machining fluid to the clean fluid tank 7B of the machining fluid storage tank 7.

When the tip of the wire electrode WE reaches the gas-liquid mixing port 14V, the wire electrode WE is carried on the gas-liquid mixed fluid in the first communication path 14R of the guide pipe 14A and is sucked up from the bottom to the top. As illustrated in FIG. 5D, a wire threading operation is performed as follows. The wire electrode WE is carried on the flow of the gas-liquid mixed fluid and passes through the first communication path 14R and the third communication path 14G at once without buckling halfway, and the tip of the wire electrode WE passes between the pair of rollers 13D and 13T that remain closed due to the rigidity of the wire electrode WE.

After the automatic wire threading is completed, the control device 91 returns the automatic wire threader 2 to the initial position and resumes machining. At the time of completion of automatic wire threading, the control device 91 stops operation of the defoaming device 8 and the conveyance device 14.

OTHER EXAMPLES

In an embodiment, an apparatus configuration has been described in which the first discharge device 14B and the second discharge device 14C are provided. However, in the case where only a wire electrode having a relatively small diameter is used, the second discharge device 14C may not be provided.

Figure 12:
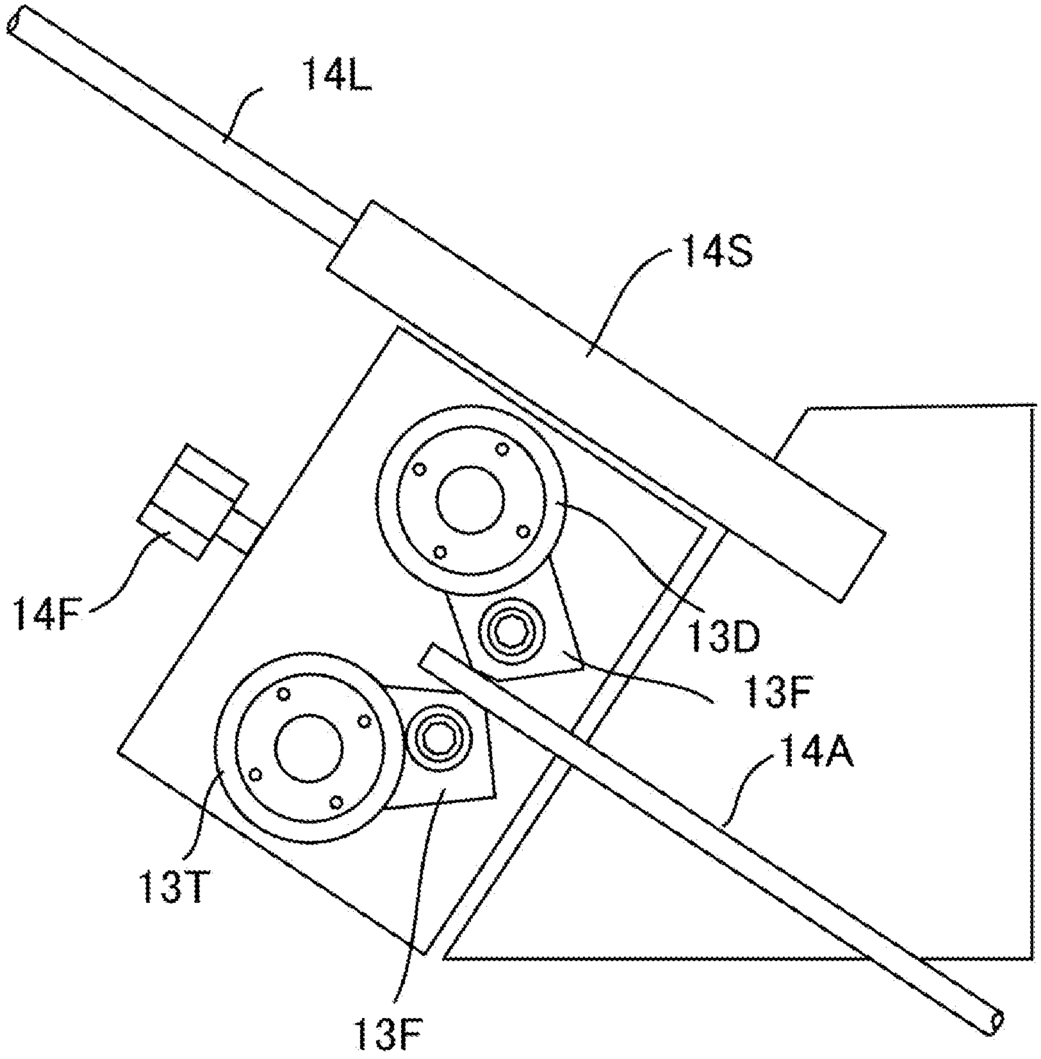
FIG. 12 illustrates another example of the conveyance device of the wire electric discharge machining apparatus according to the disclosure.

If the second discharge device 14C is not present, the pair of rollers 13D and 13T are provided so as to be located outside the machining tank 4 as illustrated in FIG. 12, and the pair of rollers 13D and 13T are provided centering on the movement path of the wire electrode WE via the connection member 13F in the vicinity of the outlet of the wire electrode WE of the first communication path 14R.

Furthermore, the advancement limit of the suction nozzle 14N of the first discharge device 14B is a position close to or in contact with the outlet of the first communication path 14R of the guide pipe 14A. The suction port 14W of the suction nozzle 14N is reciprocally moved from the initial position to the position connected to the outlet of the wire electrode WE of the first communication path 14R.

In an embodiment, an example has been described in which only the first discharge device 14B is used and the second discharge device 14C is not used if the wire electrode WE having a relatively small diameter is used. However, it is also possible to use both the first discharge device 14B and the second discharge device 14C.

In that case, both of the control valve V1 connected between the first discharge path 14K of the first discharge device 14B and the suction device 14E and the control valve V2 provided between the second discharge path 14H of the second discharge device 14C and the suction device 14E are opened, and both of the first discharge device 14B and the second discharge device 14C are used.

Furthermore, in the section "(Automatic Wire Threading Method Using Both First Discharge Device and Second Discharge Device)", the control device 91 determines whether to use the first discharge device 14B or the second discharge device 14C according to the diameter value of the wire electrode WE. However, the operator may manually select whether to use the first discharge device 14B or the second discharge device 14C using the display input device 94 or the like.

Figure 6:
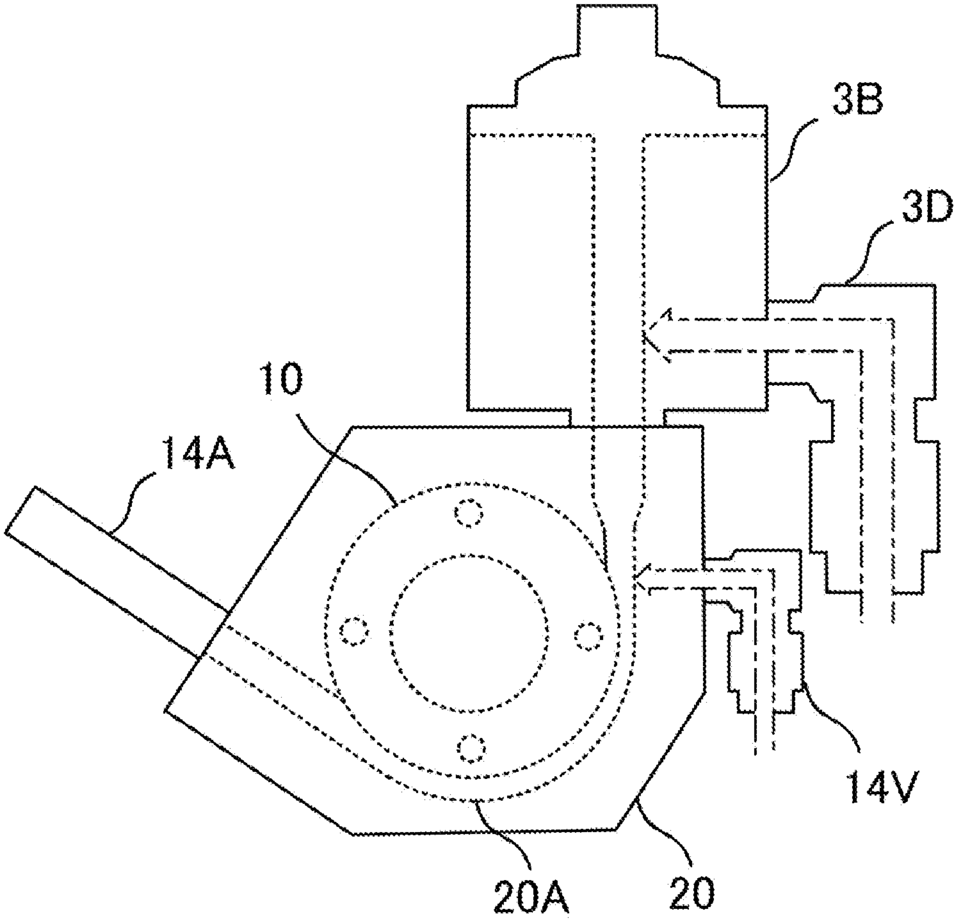
FIG. 6 illustrates another example of a gas-liquid mixing port of the wire electric discharge machining apparatus according to the disclosure.

In an embodiment, as illustrated in FIG. 3, the gas-liquid mixing port 14V is provided at one upstream end of the guide pipe 14A. However, as illustrated in FIG. 6, the gas-liquid mixing port 14V may be provided in a position communicating with the guide block 20, specific ally a travel path 20A of the guide block 20.

Then, air may be appropriately flowed into the travel path 20A of the guide block 20.

Figure 13:
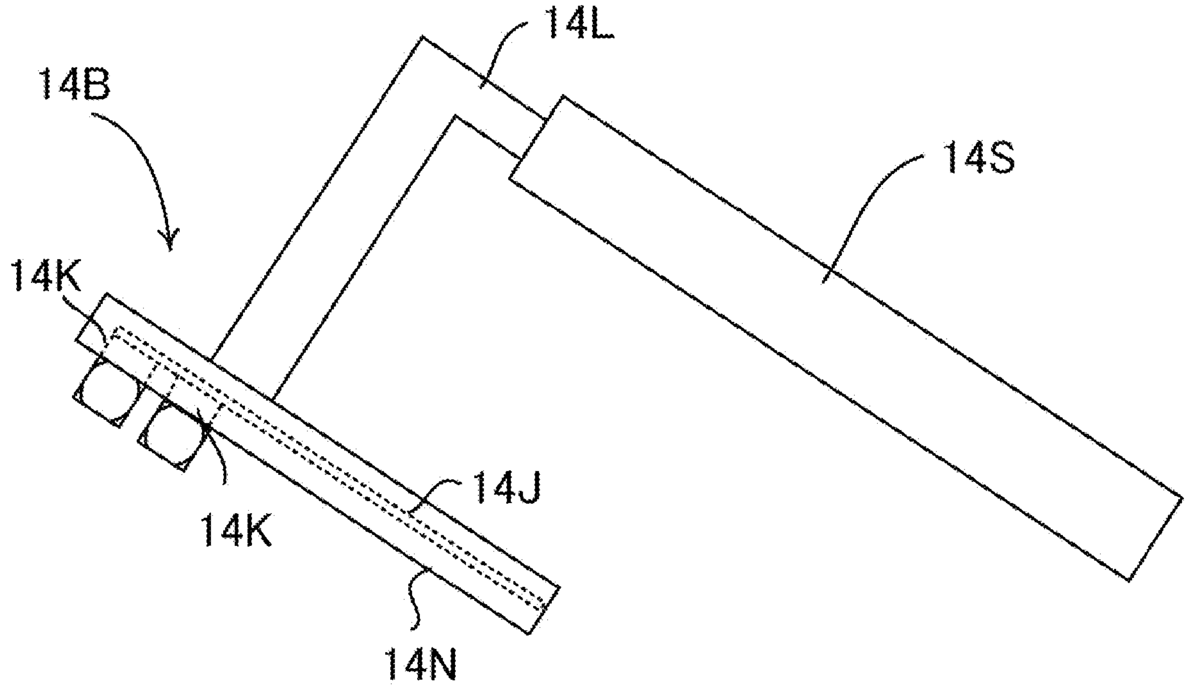
FIG. 13 illustrates another example of the first discharge device of the wire electric discharge machining apparatus according to the disclosure.

Furthermore, in an embodiment, the first discharge device 14B is equipped with the suction nozzle 14N and the connecting member 14M. However, as illustrated in FIG. 13, the suction nozzle 14N and the connecting member 14M may be integrally molded, and in that case, the suction nozzle 14N may be provided with the first discharge path 14K.

It is not necessary for the disclosure to be the same as the configuration of the wire electric discharge machining apparatus of the embodiment described above. Although several examples has been shown already, the disclosure may be deformed, or replaced in components, or combined with another disclosure in a range not departing from the technical concept of the disclosure.

The disclosure can be applied to the technical field of electric discharge machining. The disclosure allows a guide pipe in a lower arm and a conveyance device in a wire electric discharge machining apparatus to be installed on a machining tank wall without penetrating it. The disclosure makes it possible to remove a sealing device from the machining tank wall, and contributes to the development of electric discharge machining.

What is claimed is:

1. A wire electric discharge machining apparatus, comprising:

a lower arm, supporting a lower wire guide unit so as to be located in a machining tank;

at least one direction change pulley, provided on the lower arm so as to be located below the lower wire guide unit;

a winding device, comprising a pair of rollers provided so as to be located outside the machining tank; and, as a conveyance device:

a guide pipe having antistatic properties, provided along a movement path of a wire electrode between the at least one direction change pulley and the winding device, and comprising therein a first communication path allowing the wire electrode and a gas-liquid mixed fluid in which a gas and a machining fluid are mixed to pass therethrough;

a suction nozzle, provided on a downstream side in a feeding direction of the wire electrode of the winding device, and comprising therein a second communication path allowing the wire electrode and the gas-liquid mixed fluid to pass therethrough and a first discharge path discharging the gas-liquid mixed fluid; and a suction device, connected to the first discharge path and discharging the gas-liquid mixed fluid from the first discharge path.

2. The wire electric discharge machining apparatus according to claim 1, wherein the conveyance device comprises a defoaming device that defoams the gas-liquid mixed fluid.

3. The wire electric discharge machining apparatus according to claim 1, wherein the conveyance device comprises the suction nozzle as a first discharge device, and further comprises a second discharge device connected to an outlet of the wire electrode of the guide pipe; and the second discharge device comprises therein a third communication path allowing the wire electrode and the gas-liquid mixed fluid to pass therethrough and a second discharge path discharging the gas-liquid mixed fluid, and the second discharge path is connected to the suction device.

4. The wire electric discharge machining apparatus according to claim 1, wherein a material of the guide pipe comprises conductive mullite ceramics.

5. The wire electric discharge machining apparatus according to claim 1, wherein the suction device is an ejector or an aspirator.

6. The wire electric discharge machining apparatus according to claim 1, further comprising:

a control device, wherein:

the conveyance device comprises a first cylinder device connected to the suction nozzle; and the control device drives the first cylinder device to reciprocally move a suction port of the suction nozzle from the downstream side in the feeding direction of the wire electrode of the winding device being an initial position to pass between the pair of rollers to a position connected to an outlet of the wire electrode of the first communication path.

7. The wire electric discharge machining apparatus according to claim 1, further comprising:

a control device, wherein:

the conveyance device comprises a gas-liquid mixing port provided on an upstream side in the feeding direction of the wire electrode of the guide pipe and introducing the gas into the wire electric discharge machining apparatus; and the control device drives the suction device to mix the gas flowing in from the gas-liquid mixing port with the machining fluid to generate the gas-liquid mixed fluid, suction the gas-liquid mixed fluid and a tip of the wire electrode fed together with the gas-liquid mixed fluid through the first communication path and the second communication path from an inlet of the wire electrode of the first communication path, and discharge the gas-liquid mixed fluid from the first discharge path.

8. The wire electric discharge machining apparatus according to claim 1, further comprising:

a control device; and a second cylinder device connected to the pair of rollers, wherein:

the pair of rollers are provided centering on the movement path of the wire electrode at an outlet of the wire electrode of the first communication path;

the control device drives the second cylinder device to mutually open and close the pair of rollers centering on the movement path of the wire electrode, and sandwich the wire electrode discharged from the outlet of the wire electrode of the first communication path.

9. The wire electric discharge machining apparatus according to claim 3, further comprising:

a control device, wherein:

the control device switches between connection between the first discharge device and the suction device and connection between the second discharge device and the suction device based on a diameter value of the wire electrode.

10. The wire electric discharge machining apparatus according to claim 1, further comprising:

a control device, wherein:

the conveyance device comprises:

a first cylinder device connected to the suction nozzle; and a gas-liquid mixing port provided on an upstream side in the feeding direction of the wire electrode of the guide pipe and introducing the gas into the wire electric discharge machining apparatus;

the control device drives the first cylinder device to reciprocally move a suction port of the suction nozzle from the downstream side in the feeding direction of the wire electrode of the winding device being an initial position to pass between the pair of rollers to a position connected to an outlet of the wire electrode of the first communication path; and the control device drives the suction device to mix the gas flowing in from the gas-liquid mixing port with the machining fluid to generate the gas-liquid mixed fluid, suction the gas-liquid mixed fluid and a tip of the wire electrode fed together with the gas-liquid mixed fluid through the first communication path and the second communication path from an inlet of the wire electrode of the first communication path, and discharge the gas-liquid mixed fluid from the first discharge path.

* * * * *